United States Patent
Mizutani et al.

(10) Patent No.: US 7,321,767 B2
(45) Date of Patent: Jan. 22, 2008

(54) SWITCHING SYSTEM CONNECTING A RADIO COMMUNICATION TERMINAL VIA A LAN LINE TO A PUBLIC SWITCHED NETWORK OR A LEASED LINE

(75) Inventors: Yousuke Mizutani, Tokyo (JP); Yasubumi Chimura, Kanagawa (JP); Yumiko Araki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 72 days.

(21) Appl. No.: 11/018,524

(22) Filed: Dec. 22, 2004

(65) Prior Publication Data

US 2005/0143063 A1 Jun. 30, 2005

(30) Foreign Application Priority Data

Dec. 25, 2003 (JP) ............................. 2003-430527
Dec. 25, 2003 (JP) ............................. 2003-430586

(51) Int. Cl.
*H04Q 7/20* (2006.01)
*H04M 1/00* (2006.01)

(52) U.S. Cl. ................................. 455/426.1; 455/522.1

(58) Field of Classification Search ............ 455/426.1, 455/552.1, 422, 456.1–456.3, 403, 558.1, 455/410, 415, 426.2, 432.1, 435.1, 557, 456.6, 455/41, 436, 556.1
See application file for complete search history.

(56) References Cited

U.S. PATENT DOCUMENTS

2002/0187779 A1* 12/2002 Freeney, Jr. ................. 455/422
2003/0036374 A1* 2/2003 English et al. .............. 455/403
2003/0104809 A1 6/2003 Godshaw et al.
2004/0266426 A1* 12/2004 Marsh et al. ............. 455/426.2

FOREIGN PATENT DOCUMENTS

| EP | 0 758 187 A1 | 2/1997 |
| EP | 0 877 532 A3 | 11/1998 |
| EP | 1 065 902 A1 | 1/2001 |
| GB | 2 353 441 A | 2/2001 |
| GB | 2 377 136 A | 12/2002 |
| JP | 2003-046645 | 2/2003 |

* cited by examiner

*Primary Examiner*—Naghmeh Mehrpour
(74) *Attorney, Agent, or Firm*—Venable LLP; Michael A. Sartori; Catherine M. Voorhees

(57) ABSTRACT

A telephone switching system includes a position information management database and a call conversion controller. On receiving number conversion information from an adapter having a radio communication terminal connected, the database registers an identification number assigned to the adapter and terminal information particular to the communication terminal in one-to-one correspondence, thereby managing the position of the communication terminal. When a call is originated on a telephone terminal interconnected thereto or a communication terminal having a voice communication function interconnected to its LAN system, the call conversion controller searches the database on the basis of a destination number and substitutes, if terminal information corresponding to the destination number is found out in the database, the identification number of the adapter corresponding to the terminal information for the destination number to process call switching.

12 Claims, 21 Drawing Sheets

SWITCHING SYSTEM CONNECTING A RADIO COMMUNICATION TERMINAL VIA A LAN LINE TO A PUBLIC SWITCHED NETWORK OR A LEASED LINE

BACKGROUND OF THE INVENTION

1. Field of the Invention

The present invention relates to a switching system including a telephone switch capable of accommodating a public switched network line or a leased line and a LAN (Local Area Network) line, and a radio communication terminal accessible by radio in such a switching system to or from a public switched network line or a leased line, and a radio communication terminal adapter for allowing such a radio communication terminal to be accommodated in a telephone switch included in such a system.

2. Description of the Background Art

Conventionally, mobile terminals, such as a cellular phone or PHS (Personal Handyphone System) terminal for use in a public switched network, use in communication a base station included in a public switched network even while staying in the premises of a general LAN system. Therefore, for instance, a call directed to a cellular phone set carried by a person, even when staying in a building or similar local premises, should be routed through a public switched network.

It is a common practice with a telephone switch to include a trunk unit connected to a public switched network and a line unit accommodating an extension network or a LAN system. PHS terminal shave functions available for a public switched network and a LAN or an extension network and selectable by the operation of a user of the terminals. A telephone switch applied to a private PHS system can accommodate both of the extension and public switched networks. PHS terminals applicable to such a private PHS system are required to be allotted to telephone numbers for both an extension and a public switched network. More specifically, when communication is to be held on such a PHS terminal via the public switched network, the telephone switch uses a telephone number A assigned for the public switched network to establish a central office call connection, whereas for communication to be held on the PHS terminal via the extension network, the telephone switch uses another telephone number B assigned for the extension network to establish an extension call connection.

Today, it is often the case that one and the same person possesses plural kinds of communications terminals, such as a cellular phone set, a PHS terminal available in a public switched network and a private branch exchange network, a conventional telephone set and an IP (Internet Protocol) phone terminal accommodated by a telephone switch in a LAN system and a personal computer or similar data processing terminal, such as a personal data assistant. In such a case, another person, intending to call the above-stated person, has to select one of the different numbers each assigned to his or her particular communication terminal.

More specifically, the conventional switching system requires a person, when originating a call to the above-stated person, to selectively use telephone numbers assigned for a public switched network or a central office line and for an extension network or an extension available to that called person. This brought about a problem that, even with a LAN system including a stabler and less expensive extension network, a person who wishes to originate a call directed to a cellular phone terminal on the extension could not use the extension network because the cellular phone terminal is adapted to communicable only with a base station of the public switched network. Particularly, with a private PHS system in which both of the extension network and the public switched network or central office lines are available to one and the same PHS terminal, a person, when originating a call meant to that PHS terminal on the extension, must appropriately select an extension number or a central office line number allotted to that terminal.

In light of the above, Japanese patent laid-open publication No. 2003-046645, for example, discloses a system in which the number of a cellular phone set is stored and which provides its base station or switching system with the function of transferring a call to be terminated on the cellular phone set to an extension network. More specifically, in the prior art system, a call originating through a public switched network to that cellular phone is transferred and terminated to its extension telephone number. That requires both a base station and a telephone switch to set a call transfer therein. In this sense, the system should preferably be provided with a simpler configuration.

Moreover, the system configured to terminate an incoming call directed to a cellular phone set onto its extension line number, as taught in the above laid-open publication, temporarily disables the functions of the cellular phone set and therefore prevents them from being effectively used.

SUMMARY OF THE INVENTION

It is an object of the present invention to provide a switching system capable of allowing a PBX (Private Branch Exchange) system to accommodate a radio communication line accessible to or from a public switched network line, thus not forcing a calling person into appropriate telephone number selection, but allowing a call to be established over a LAN line connected to the PBX system.

It is another object of the present invention to provide a radio communication terminal, a radio communication terminal adapter, and a computer program capable of establishing a call directed to a radio communication terminal over a LAN line with an effective use of the functions available with the radio communication terminal.

In accordance with the present invention, an switching system has a LAN line connectable to a radio communication terminal, which effects radio communication to either one of a public switched network line and a leased network line, to execute call switching. A telephone switching system accommodates the public switched network line and LAN line and executes the call switching. A terminal adapter delivers, when connecting the radio communication terminal, number conversion information including terminal information stored in the radio communication terminal and an identification number assigned to the terminal adapter to the telephone switching system, and effects communication between the radio communication terminal and the switching system. The telephone switching system includes a position information manager and a call switching controller. The position information manager registers, on receiving the number conversion information from the adapter, the identification number of the terminal adapter and the terminal information of the radio communication terminal included in the number conversion information in one-to-one correspondence for thereby managing position information of the radio communication terminal connected to the terminal adapter. The call switching controller searches, on receiving a call originated on either one of a telephone terminal and an accommodated communication terminal having a voice communication function and interconnected to the LAN line, the position information manager for the terminal information in accordance with a destination number and substitutes, if the terminal information matching with the destination number is present in the position information manager, the identification number of the terminal adapter matching with the terminal information for the destination number to thereby control call switching.

Also, in accordance with the present invention, a terminal adapter connectable to a radio communication terminal effecting radio communication to either one of a public switched network line and a leased network line allows the radio communication terminal to be accommodated in a telephone switching system. A connector is connectable to at least one radio communication terminal. A communication controller controls communication with a LAN line side. A number conversion information sending section receives terminal information from the radio communication terminal connected to the connector, and provides the telephone switching system with number conversion information, which includes at least the terminal information and identification information assigned to the terminal adapter. A voice controller executes voice control on the basis of control information for a voice processing system, which is received from the radio communication terminal, to hold voice communication between the radio communication terminal and the telephone switching system.

Further, in accordance with the present invention, a radio communication terminal is connectable to a terminal adapter, which is capable of being accommodated by a telephone switching system, for effecting voice communication over a LAN line. A connector is connectable to the adapter. A voice processor executes voice processing. A controller detects the connection of the radio communication terminal to the terminal adapter, disables a radio communication section connectable to either one of a public switched network line and a leased network line and makes the voice processor and adapter connectable to each other.

Moreover, in accordance with the present invention, a program is presented which connects a radio communication terminal, which effects radio communication to a public switched network line or a leased network line, to a terminal adapter for the radio communication terminal to thereby cause the radio communication terminal to be accommodated in a telephone switching system. The program is runnable on a processor system included in either one of the radio communication terminal and the terminal adapter to implement two different functions, i.e. a communication control function for allowing communication to be held between the radio communication terminal and the telephone switching system on the basis of control information of a voice processing system of the radio communication terminal, and a number conversion information sending function for providing to the telephone switching system with number conversion information including at least terminal information particular to the radio communication terminal and an identification number assigned to the terminal adapter.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
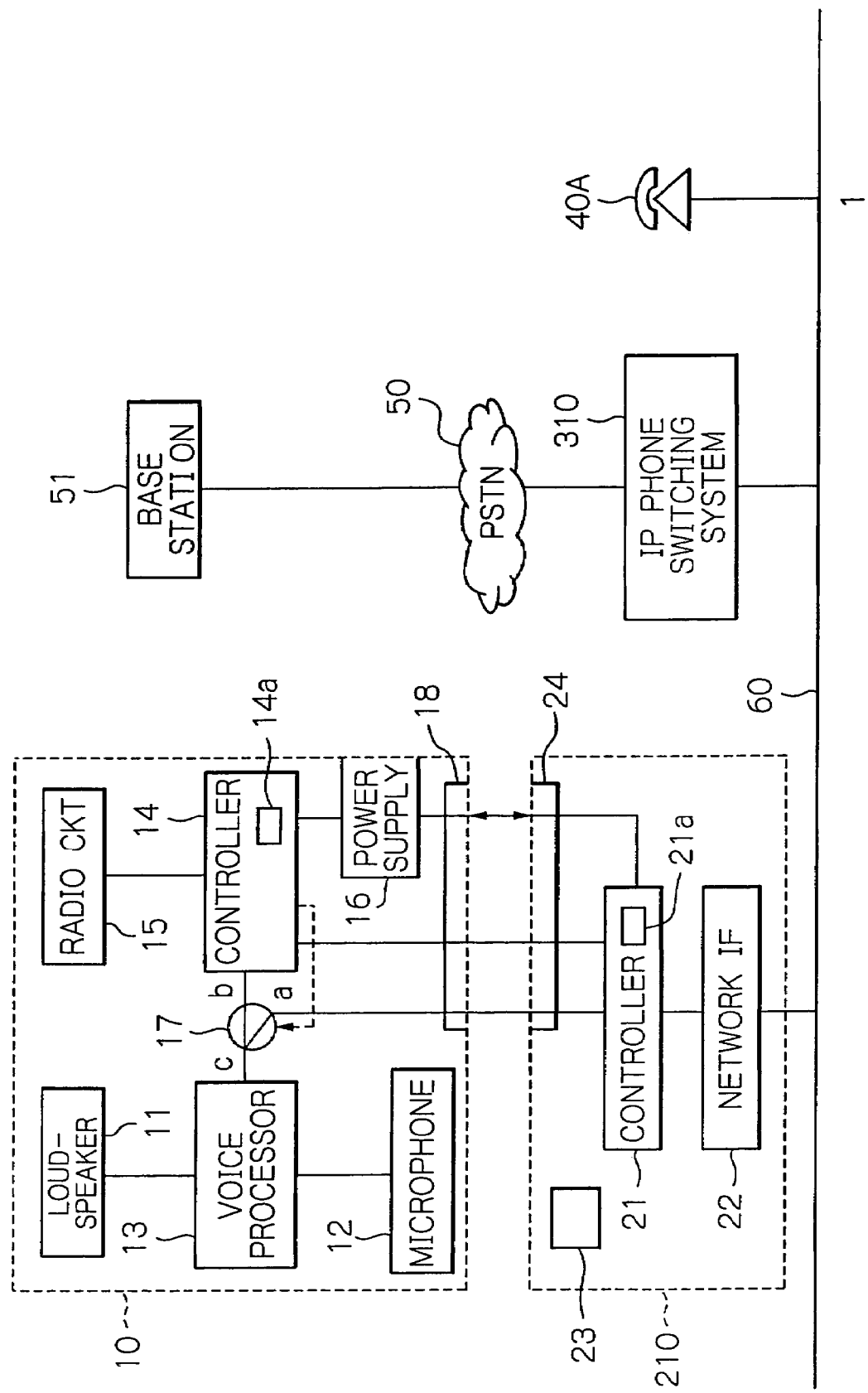
FIG. 1 is a schematic block diagrams showing a specific configuration of a first embodiment of the switching system in accordance with the present invention.
Figure 2:
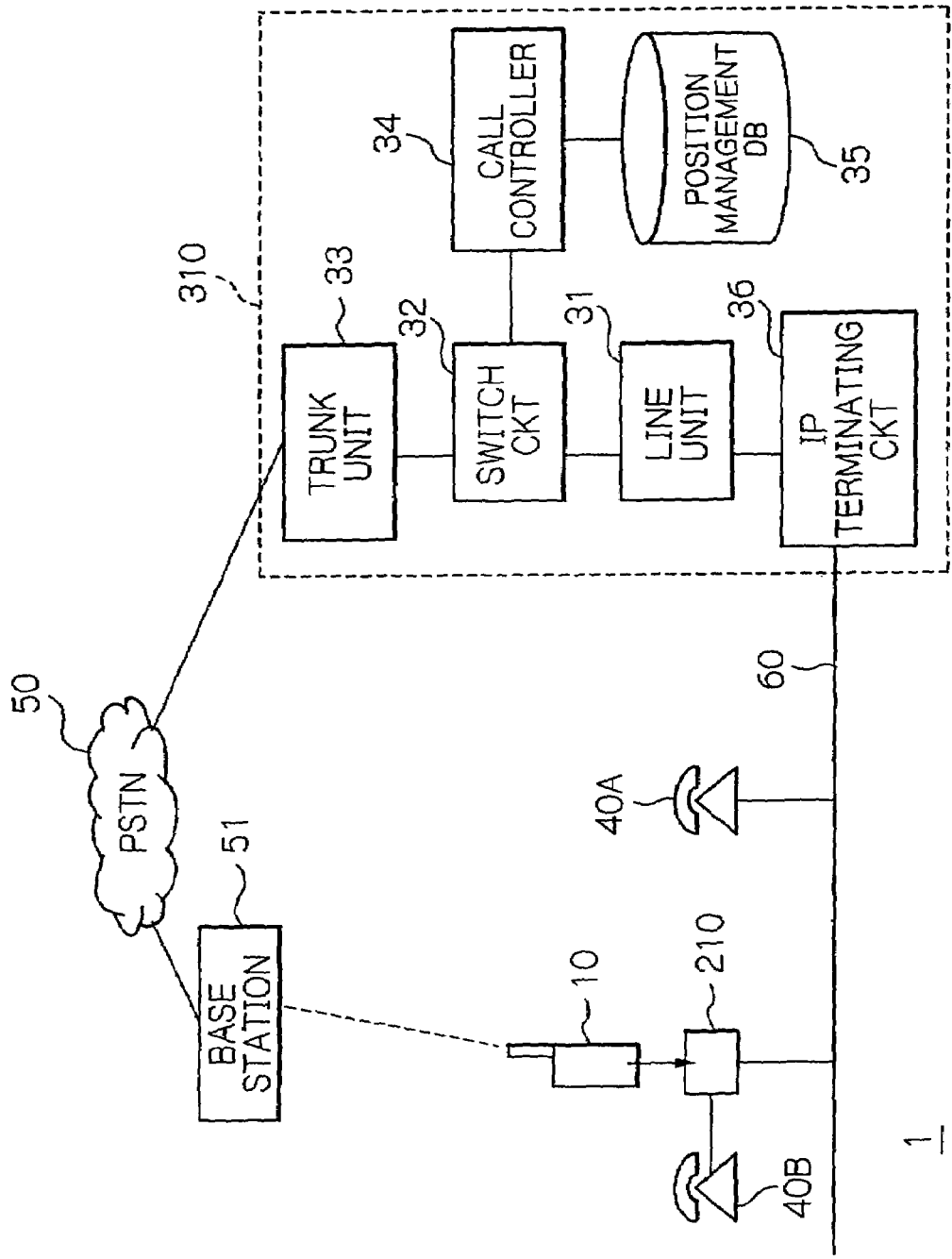
FIG. 2 is a schematic block diagrams showing another specific configuration of the first embodiment.

Referring now to FIG. 1 of the accompanying drawings, a first embodiment of the switching system in accordance with the present invention is adapted to allow a radio communication terminal to be connected to a LAN system so as to be under the control of the LAN system. As shown, the switching system, generally 1, includes a radio communication terminal 10 and a terminal adapter 210. In the illustrative embodiment, the radio communication terminal 10 is implemented as a mobile phone set such as a cellular phone set by way of example and the adapter 210 is allowed to connect the radio communication terminal 10. FIG. 2 exemplarily shows the configuration of an IP (Internet Protocol) phone switching system 310 belonging to a LAN system 60 also included in the illustrative embodiment.

As shown in FIGS. 1 and 2, the LAN system 60 includes at least IP phone sets or terminals 40A and 40B in addition to the IP phone switching system 310 and adapter 210. The cellular phone terminal 10 is capable of communicating by radio with a base station 51 included in a public switched telephone network (PSTN) 50. The LAN system 60 is an extension network accommodated in the IP phone switching system 310. A personal computer, a conventional telephone set, a private PHS base station or similar apparatus may also be accommodated in the IP phone switching system 310, although not shown specifically. Further, a router, for example, may be disposed in the extension network 60 to allow the IP phone switching system 310 to be connected to an IP line.

The public switched network 50 is used by the cellular phone terminal 10 at the time of ordinary radio communications. A leased line or network may be replaced for the network 50 as so long as it is discrete from the LAN line 60.

The cellular phone terminal 10 is a radio communication terminal capable of effecting radio communication via the base station 51 included in the public switched network 50. The cellular phone terminal 10 may, of course, be replaced with any other radio communication terminal, such as a PHS terminal or a PDA (Personal Digital Assistant).

When the cellular phone terminal 10 is connected to the adapter 210, which will be described more specifically later, use is made of a voice communication function or a VoIP (Voice over IP) function available with the adapter 210 to thereby hold speech transmission on the phone terminal 10 via the extension network or the LAN line 60. When the cellular phone terminal 10 is not connected to the adapter 210, radio communication can be held with the base station 51 on the phone terminal 10.

As shown in FIG. 1, the cellular phone terminal 10 includes at least a loudspeaker 11, a microphone 12, a voice processor 13, a controller 14, a radio circuit 15, a power supply 16 and a switch 17 interconnected as illustrated. The controller 14 is adapted to control the operation of the entire cellular phone terminal 10 and may be implemented by a processor system, including a CPU (Central Processing Unit), a RAM (Random Access Memory) and a ROM (Read Only Memory), by way of example.

The controller 14 selectively performs two different functions when the cellular phone terminal 10 is connected to the adapter 210, i.e. a connection establishing function and a phone number reporting function. With the connection establishing function, the controller 14 provides a controller 21 included in the adapter 210 with control information relating to the voice communication function, thereby establishing voice communication between the adapter 210 and the phone terminal 10. On the other hand, with the phone number reporting function, the controller 14 reports a telephone number stored beforehand in the cellular phone terminal 10 to the adapter 210. Let the telephone number assigned to the cellular phone terminal 10 be referred to as a cellular phone number hereinafter.

More specifically, as for the connection establishing function in the controller 14, when the cellular phone terminal 10 is connected to the adapter 210, the controller 14 of the phone terminal 10 receives a connection report fed from the adapter 210 and then makes the radio circuit 14 disable its radio control. Subsequently, the controller 14 causes the switch 17 to connect its terminal a to its terminal c in place of its terminal b, see FIG. 1. At the same time, the controller 14 delivers the control information relating to the voice communication function to the controller 21 of the adapter 210, so that speech signals can be transmitted between the voice processor 13 and the adapter 210. In this condition, the voice communication is available with the cellular phone terminal 10 in the LAN system 60 via the adapter 210.

In addition, as for the connection establishing function in the controller 14, when the cellular phone terminal 10 becomes unable to communicate with the adapter 210, the controller 14 of the phone terminal 10 detects disconnection, makes the radio circuit 15 able to perform radio control, and again causes the switch 17 to connect its terminal b to its terminal c, see FIG. 1. This allows radio communication to be held on the cellular phone terminal 10.

As for the phone number reporting function, after the connection has been established between the cellular phone terminal 10 and adapter 210, the controller 14 of the phone terminal 10 reports the cellular phone number stored in a storage 14a thereof to the adapter 210. In this condition, the cellular phone terminal 10 is ready to send out a number conversion registration request to the IP phone switching system 310 via the adapter 210.

The loudspeaker 11 receives, during speech transmission, voices processed by the voice processor 13 from the voice processor 13 and delivers the processed voices to the user of the cellular phone terminal 10 while amplifying them. The microphone 12 captures user's voices and delivers them to the voice processor 13.

The voice processor 13 is adapted to process voice or speech signals and selectively transmit the voice signals to and from the controller 14 or the adapter 210 in accordance with the operation of the switch 17 controlled by the controller 14. More specifically, when the terminal c of the switch 17 is connected to the terminal a under the control of the controller 14, see FIG. 1, the voice processor 13 processes voice signals captured by the microphone 12 and sends out the resulting voice signals to the adapter 210 via the switch 17. Also, the voice processor 13 processes voice signals received from the adapter 210 to thereby reproduce voices on the loudspeaker 11. In this way, the voice signals are transferred between the voice processor 13 and the adapter 210.

On the other hand, when the terminal c of the switch 17 is connected to the terminal b under the control of the controller 14, see FIG. 1, the voice processor 13 processes voice signals captured by the microphone 12 and delivers the resulting voice signals to the radio circuit 15 via the switch 17 and the controller 14. Also, the voice processor 13 processes voice signals input via the radio circuit 15 and the controller 14 for thereby reproducing the voices on the loudspeaker 11. In this manner, the voice signals are transferred between the voice processor 13 and the radio circuit 15 via the controller 14.

The radio circuit 15 performs its radio control for allowing radio communication to be held between the cellular phone terminal 10 and the base station 51 of the public switched network 50. More specifically, when the terminal c of the switch 17 is connected to the terminal b under the control of the controller 14, see FIG. 1, the radio circuit 15 transfers voice signals to and from the voice processor 13 via the controller 14, i.e. demodulates a radio signal received from the base station 51, feeds the resulting demodulated radio signal to the voice processor 13 via the controller 14, modulates a voice signal input from the voice processor 13 via the controller 14 and sends out the resulting modulated voice signal to the base station 51.

The power supply 16 feeds power to the various circuits of the cellular phone terminal 10. When the cellular phone terminal 10 is connected to the adapter 210, the power supply 16 feeds power to the adapter 210 as well.

The switch 17 is responsive to the controller 14 so that it has its terminal c connected to the terminal a, see FIG. 1, when the cellular phone terminal 10 is connected to the adapter 210 or connected to its terminal b, see FIG. 1, when the former is not connected to the latter.

The cellular phone terminal 10 and adapter 210 include connectors 18 and 24, respectively. When the connector 18 is coupled to the connector 24, data transmission can be held between the cellular phone terminal 10 and the adapter 210.

The configuration of the terminal adapter 210 will be described more specifically with reference to FIGS. 1 and 2. As shown, the terminal adapter 210 is interconnected to the IP phone switching system 310 belonging to the LAN system 60 and causes, when connected to the cellular phone terminal 10, the phone terminal 10 to be connected to the IP phone switching system 310. The adapter 210 may additionally connect the LAN system 60 to the other IP phone 40B or similar communication terminal, such as a personal computer, having the VoIP function. Further, the function of the adapter 210 to be described hereinafter may be included in and implemented by the cellular phone terminal 10, if desired.

The adapter 210 also receives a connection confirmation report sent out from the IP phone switching system 310 at predetermined intervals. The adapter 210 returns an answer signal to the IP phone switching system 310 when the cellular phone terminal 10 is connected, but does not return it when the phone terminal 10 is not connected. This allows the IP phone switching system 310 to determine whether or not the cellular phone terminal 10 is connected to the adapter 210.

As shown in FIG. 1, the adapter 210 includes at least a network interface (IF) 22 and a voice controller 23 in addition to the controller 21 and connector 24. The controller 21 is adapted to control the operation of the adapter 210 by means of, e.g. its processor system including a CPU, a RAM and a ROM, and implements a voice communication function or a VoIP function for the LAN system 60. Further, when the connector 18 of the cellular phone terminal 10 is connected to the connector 24 of the adapter 210, the controller 21 is received control information from the controller 14 of the phone terminal 10. In response, the controller 21 establishes a connection between the cellular phone terminal 10 and the LAN system 60 while matching the voice communication function of the former to that of the latter. This function of the controller 21 will be referred to as a connection establishing function hereinafter. The controller 21 additionally has a number conversion registration requesting function, i.e. a function of causing the IP phone switching system 310 to register the cellular phone number of the cellular phone terminal 10 and the extension number of the adapter 210 connected thereto in one-to-one correspondence.

If desired, the system may be designed such that the functions of the controller 21 described above may be assigned to the controller 14 of the cellular phone terminal 10. In such a case, the adapter 210 may be configured as a simple interface for allowing the cellular phone terminal 10 to be connected to the extension network 60.

More specifically, as for the connection establishing function in the controller 21, the controller 21 detects the connection of the cellular phone terminal 10 to the adapter 210 when supplied with electric power from the power supply 16 of the phone terminal 10. The controller 21 then sends out a connection report to the controller 14 of the cellular phone terminal 10 and awaits the transmission of voice signals to and from the voice processor 13 of the cellular phone terminal 10. This allows the adapter 210 to communicate with the cellular phone terminal 10. The number conversion registration requesting function is such that the controller 21 sends out number conversion information for requesting the registration of number conversion to the IP phone switching system 310. In response, the IP phone switching system 310 registers the cellular phone number of the cellular phone terminal 10 and the extension number of the adapter 210 in one-to-one correspondence in accordance with the number conversion information.

The controller 21 includes a storage 21a storing an extension number assigned to the adapter 210. FIG. 1 illustrates a specific case wherein the adapter 210 is connectable to the LAN system 60 alone. In this case, an extension number is assigned to the adapter 210 and stored in the storage 21a of the controller 21. In FIG. 2, showing another specific case wherein the IP phone 40B is connected to the adapter 210, an extension number assigned to the IP phone 40B is stored in the storage 21a.

It is to be noted that the number conversion information to be sent from the controller 21 to the IP phone switching system 310 includes at least the cellular phone number received from the cellular phone terminal 10, an extension number and connection validity information indicative of whether or not the connection is successful between the phone terminal 10 and adapter 210.

In the adapter 210, the network interface 22 is a LAN interface for implementing connection and communication based on a communication scheme particular to the LAN system 60. The voice controller 23 insures the transmission of voice signals between the adapter 210 and the cellular phone terminal 10 by adjusting sampling frequencies and converting a voice coding scheme used in the phone terminal 10 and LAN system 60. Further, the connector 24 is adapted for connecting the cellular phone terminal 10 to the adapter 210, or allows data communication to be held between the cellular phone terminal 10 and the adapter 210 when connected to the connector 18 of the phone terminal 10.

A specific configuration of the IP phone switching system 310 will be described with reference also made to FIGS. 1 and 2. The IP phone switching system 310 is a call switching system having the appearances of a plurality of IP phones 40A and 40B (sometimes collectively labeled 40 hereinafter) and the adapter 210 connectable to the LAN system 60. In addition, the IP phone switching system 310 is connectable to the public switched network 50 as well. If desired, a common-line signaling system may be applied to the IP phone switching system 310, although not shown specifically in FIGS. 1 and 2. Further, the IP phone switching system 310 may be configured such that a router, a gateway or similar network relay equipment switches calls to be described hereinafter.

The IP phone switching system 310 is adapted to send out a connection confirmation report to the accommodated adapter 210 via the LAN system 60 at predetermined intervals, as stated earlier. The IP phone switching system 310 then determines that the adapter 210, when having returned an answer signal to the switching system 310, connects the cellular phone terminal 10.

As shown in FIG. 2, the IP phone switching system 310 includes a line unit 31, a switch circuit 32, a trunk unit 33, a call controller 34, a position management database (DB) 35 for the cellular phones and an IP line terminating circuit 36 interconnected as illustrated. The position management database 35 is adapted to store the extension number of the adapter 210 or the IP phone 40 and the cellular phone number of the cellular phone terminal 10 while relating them to each other. If desired, the position management database 35 may be linked to an existing database that manages extension numbers.

The call controller 34 is adapted for controlling the switch 32 and may be implemented by a processor system including a CPU, a RAM and a ROM, by way of example. The call controller 34 sends out the connection confirmation report at predetermined intervals and determines that the adapter 210, when having returned an answer to the above report, connects the cellular phone terminal 10. Also, on receiving number conversion information mentioned earlier from the adapter 210 connected the cellular phone terminal 10, the call controller 34 registers the extension number of the adapter 210 and the cellular phone number of the cellular phone terminal 10 at the position management database 35 while matching them to each other. If the adapter 210 does not return the answer, the call controller 34 determines that the cellular phone terminal 10 is disconnected from the adapter 210, and deletes the cellular phone number registered at the position management database 35.

Further, when a call is originated, the call controller 34 references the position management database 35 on the basis of a number assigned to the destination of the call to control the switch circuit 32. For example, when a call meant for the cellular phone terminal 10 is originated on the extension network 60, the call controller 34 references the position management database 35 on the basis of the destination number to search for a cellular phone number corresponding to the destination number. If the cellular phone number in question is found out in the position management database 35, then the call controller 34 selects an extension number matched to the destination number or the cellular phone number and then controls the switch circuit 32 to allow signals to be sent out to the adapter 210 designated by the extension number selected.

The switch circuit 32, monitoring a call origination and other events on the extension network 60 or the public switched network 50, performs switching under the control of the call controller 34 so as to enable communication with the IP phone 40 or the adapter 210 to which the destination number is assigned.

The line unit 31 is connected to the LAN system 60 and is adapted for processing speech communication with the IP phones 40A and 40B or the adapter 210. The IP terminating circuit 36, also having the appearance of the line from the extension network 60, performs processing in accordance with the transmission system or an IP protocol particular to the LAN system 60 and processing relating to the physical layer. The trunk unit 33 has the appearance of the line from the public switched network 50 and handles speech transmission to and from the public switched network 50 thus connected.

Figure 3:
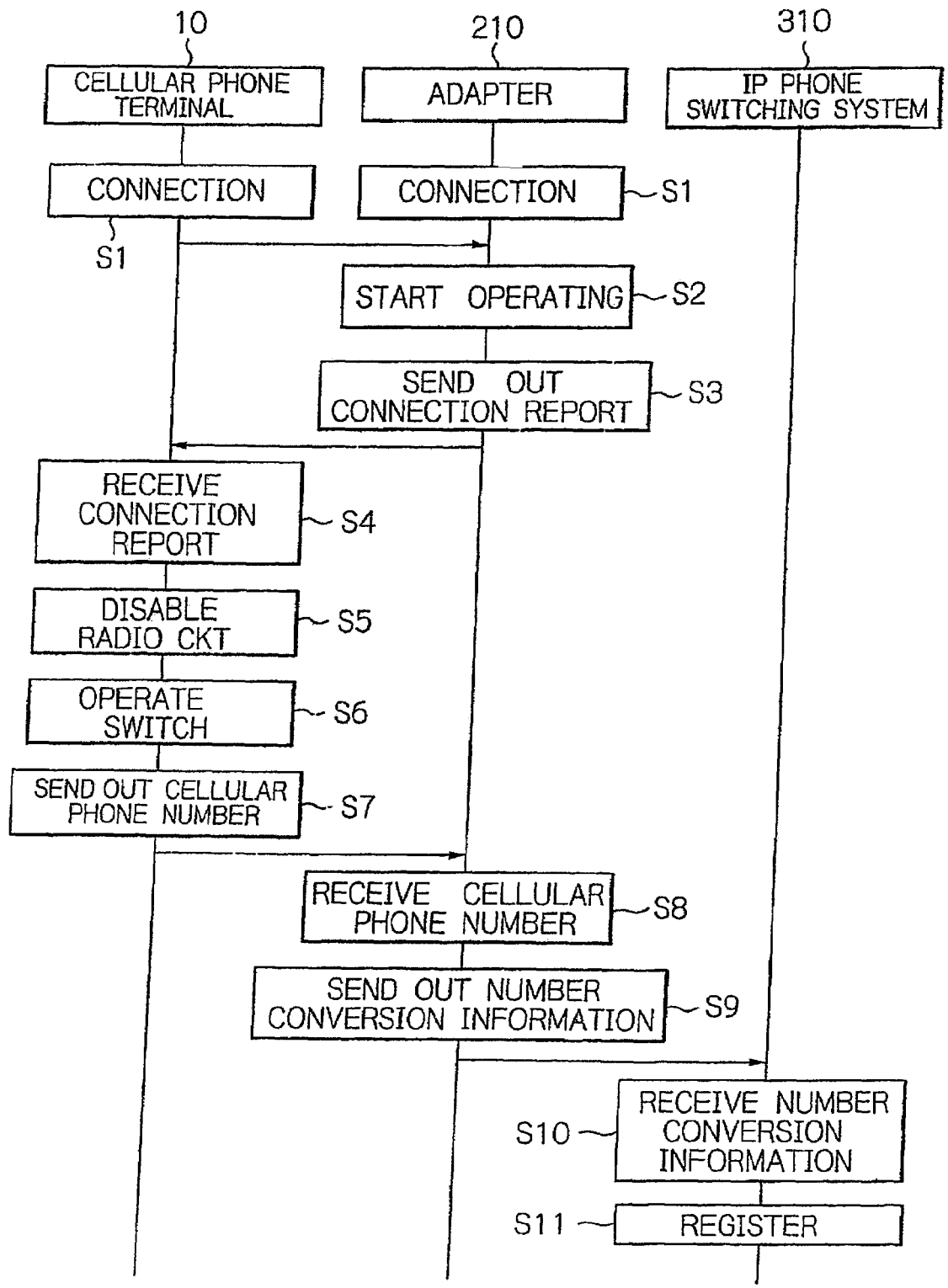
FIG. 3 is a flowchart useful for understanding a specific procedure to be executed by the first embodiment when a cellular phone set is connected to an adapter.

Specific operations of the illustrative embodiment having the above construction will be described hereinafter. First, it will be described with reference to FIG. 3 how the cellular phone terminal 10, adapter 210 and IP phone switching system 310 operate when the phone terminal 10 is connected to the adapter 210. As shown, when the cellular phone terminal 10 is connected to the adapter 210 (step S1), the connector 18 included in the phone terminal 10 is brought into contact with the connector 24 included in the adapter 210. As a result, power is fed from the power supply 16 of the cellular phone terminal 10 to the adapter 210, causing the adapter 210 to start operating (step S2).

After the step S2, the controller 21 of the adapter 210 sends out a connection report to the controller 14 of the cellular phone terminal 10 (step S3). Upon receiving the connection report (step S4), the controller 14 makes the radio circuit 15 unable to perform radio control (step S5) under the control of the controller 14. At the same time, the controller 14 causes the switch 17 to connect its terminal c to its terminal a for thereby allowing the voice processor 13 and the controller 21 of the adapter 210 to transmit and receive voice signals (step S6). In addition, the controller 21 of the adapter 210 is connected to the controller 14 of the cellular phone terminal 10 and subject to the operation of the controller 14.

For example, when a call addressed to another phone connected to the extension network 60 or the public switched network 50 is originated on the cellular phone terminal 10 connected to the adapter 210, the controller 21 receives a destination number input by the user on the phone terminal 10 from the controller 14 and then originates a call to the IP phone switching system 310 on the basis of the destination number. In this illustrative embodiment, the number of a source originating the call is the extension number assigned to the adapter 210. This allows the IP phone switching system 310 to smoothly execute call switching.

After the step S6, the controller 14 of the cellular phone terminal 10 sends out the cellular phone number, e.g. N10 of the cellular phone terminal 10 stored in the storage 14a to the controller 21 of the adapter 210 (step S7). On receiving the cellular phone number N10 (step S8), the controller 21 sends out number conversion information, which includes the cellular phone number N10, extension number, e.g. N40 assigned to the adapter 210 and connection validity information, to the IP phone switching system 310 (step S9). On receiving the number conversion information (step S10), the call controller 34 of the IP phone switching system 310 registers the extension number N40 of the adapter 210 and cellular phone number N10 at the position management database 35 while making them associative with each other (step S11). It follows that when a call meant for the cellular phone terminal 10, i.e. cellular phone number N10 is originated, the cellular phone number N10 can be converted to the extension number N40 of the adapter 210.

Figure 4:
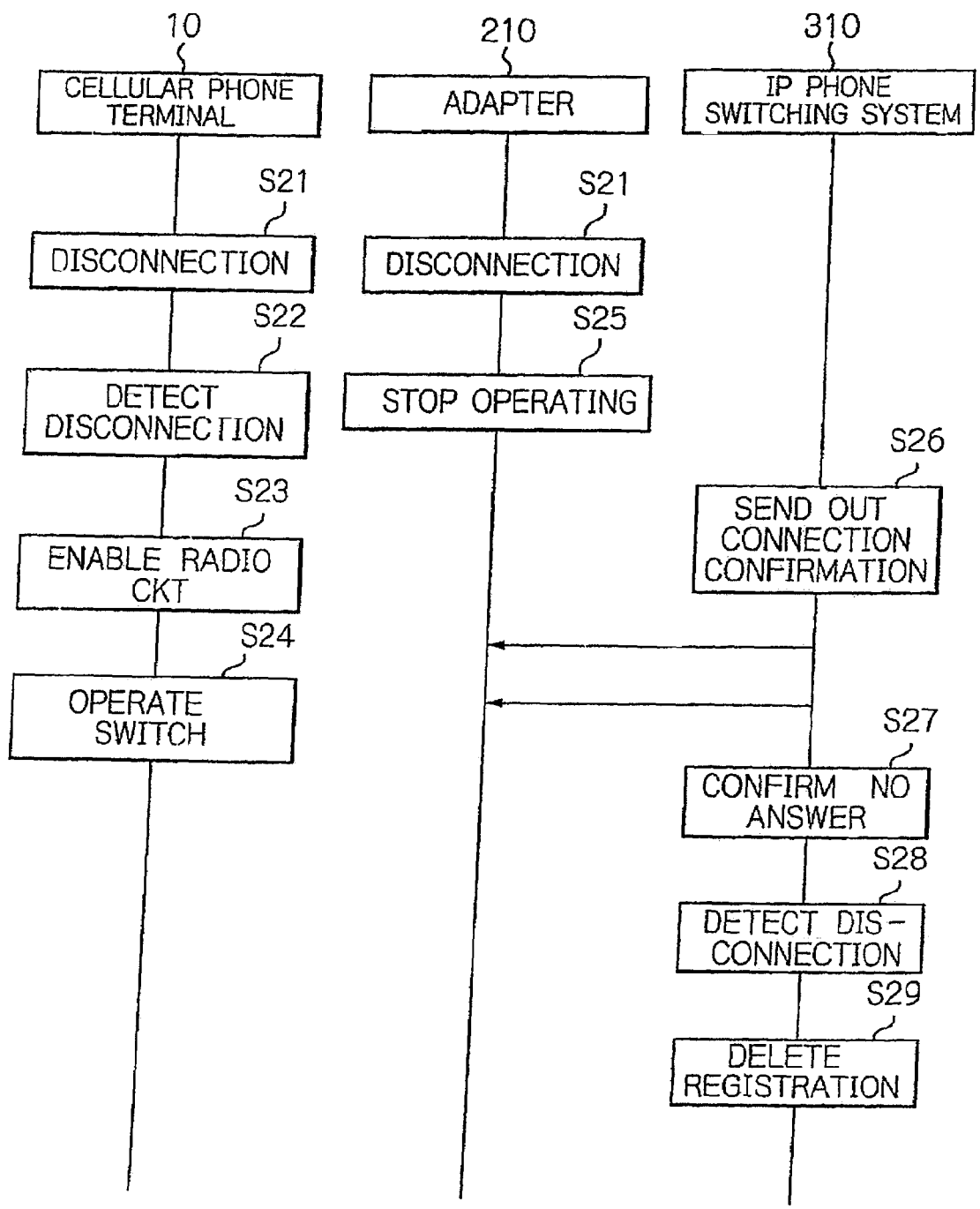
FIG. 4 is a flowchart useful for understanding a specific procedure to be also executed by the first embodiment when the cellular phone set is disconnected from the adapter.

Reference will be made to FIG. 4 for describing the operations of the cellular phone terminal 10, adapter 210 and IP phone switching system 310 to occur when the cellular phone terminal 10 is disconnected from the adapter 210. As shown, when the cellular phone terminal 10 is removed from the adapter 210 (step S21), power supply from the phone 11 to the adapter 210 is shut off with the result that the adapter 210 stops operating (step S25). At the same time, the controller 14 of the cellular phone terminal 10 becomes unable to communicate with the controller 21 of the adapter 210 and therefore detects the disconnection of the phone terminal 10 from the adapter 210 (step S22).

After the step S22, the controller 14 of the cellular phone terminal 10 again enables the radio control function of the radio circuit 15 (step S23). At the same time, the controller 14 causes the switch 17 to connect the terminal c to the terminal b to allow the voice processor 13 and controller 14 to transfer voice signals therebetween (step S24). The cellular phone terminal 10 thus disconnected from the adapter 210 is again capable of communicating by radio with the base station 51 of the public switched network 50.

When the adapter 210 stops operating in the step S25, it stops returning an answer signal to a connection confirmation report output from the IP phone switching system 310 at the predetermined intervals (step S26). Upon confirming the disappearance of the answer signal (step S27), the IP phone switching system 310 determines that the cellular phone terminal 10 is disconnected from the adapter 210 (step S28). Subsequently, the call controller 34 of the IP phone switching system 310 deletes the cellular phone number N10 registered at the position management database 35 while being related to the extension number N40 of the adapter 210 (step S29).

Figure 5:
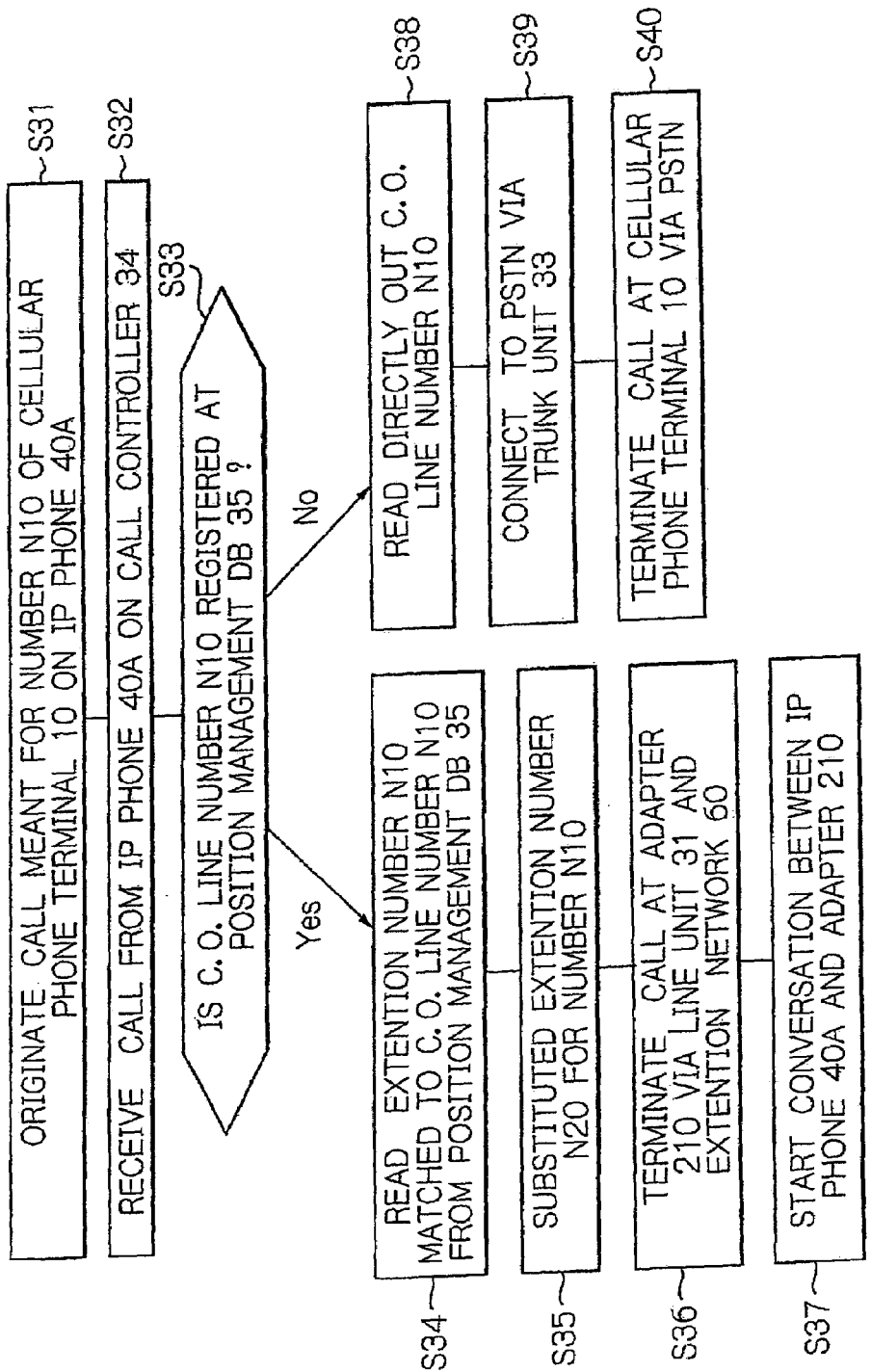
FIG. 5 is a flowchart useful for understanding a specific switching sequence particular to the first embodiment.

FIG. 5 demonstrates a specific procedure for coping with a call meant for the cellular phone terminal 10 and originated on the IP phone 40A, which is connected to the extension network 60, when the cellular phone number N10 is registered at the position management database 35 of the IP phone switching system 310 while being related to the adapter 210. As shown, when a call meant for the cellular phone number N10 of the cellular phone terminal 10 is originated on the IP phone 40A (step S31), the call controller 34 of the IP phone switching system 310 is called by the IP phone 40A (step S32). In response, the call controller 34 searches the position management database 35 for the cellular phone number or destination number N10 by any suitable method (step S33). For example, the call controller 34 may check cellular phone numbers registered at the position management database 35 one by one or at the same time.

If the answer of the step S33 is positive, Yes, meaning that the cellular phone number or destination number N10 is present in the position management database 35, then the call controller 34 reads out an extension number N20 matched to the cellular phone number N10 (step S34). Subsequently, the call controller 34 substitutes the extension number N20 for the destination number and then executes switching control on the basis of the extension number N20 (step S35). The representative information of the extension number N20 produced by the call switching of the call controller 34 is subjected to the communication processing by the line unit 31 and IP terminating circuit 36 and then sent out to the adapter 210 via the extension network 60 (step S36).

When the above information is received by the adapter 210, a speech transmission begins to be held between the adapter 210 and the IP phone set 40A. More specifically, a speech signal from the IP phone set 40A is processed by the controller 21 of the adapter 210 in accordance with the call held on the cellular phone terminal 10 and then fed to the voice processor 13 of the cellular phone terminal 10. The voice processor 13 processes the voice signal to thereby reproduce voice input on the IP phone set 40A (step S37).

On the other hand, if the answer of the step S33 is negative, No, meaning that the cellular phone number or destination number N10 is not registered at the position management database 35, then the call controller 34 determines that the cellular phone terminal 10 is not connected to the extension network 60. In this case, the call controller 34 determines that the call should be routed to the public switched network 50, i.e. the outside or central office (C.O.) line and then executes call switching on the basis of the destination number, i.e. the cellular phone number N10 (step S38). The speech signal thus output from the IP phone set 40A and processed by the call controller 34 is subjected to the speech signal processing by the trunk unit 33 and then connected to the public switched network 50 (step S39). Finally, the speech signal is transmitted via the public switched network 50 to the cellular phone terminal 10 (step S40).

The illustrative embodiment stated above has various unprecedented advantages, as will be described hereinafter. When the adapter 210 connects the cellular phone terminal 10, the radio communication function of the phone terminal 10 is automatically disabled and does not have to be monitored by the base station 51 of the public switched network 50. Also, the cellular phone terminal 10, connected to the adapter 210, is allowed to use the voice communication function of the adapter 210 and can therefore be used as a telephone terminal involved in the LAN system 60.

In the illustrative embodiment, the extension number of the adapter 210 and the cellular phone number of the cellular phone terminal 10 connected to the adapter 210 are registered at the IP phone switching system 310 in one-to-one correspondence. It follows that a call originated simply by means of the cellular phone number allows a destination to connect to automatically be found out. Further, a person, originating a call to be terminated on the cellular phone controlled by the LAN system, does not have to distinguish the extension number from the cellular phone number.

The IP phone switching system 310 is capable of switching an extension and a central office line in accordance with whether or not the adapter 210 connects the cellular phone terminal 10. More specifically, even when a person originates a call meant for the cellular phone terminal 10, which is connected to the adapter 210, on the extension, the IP phone switching system 310 can handle the call directed to the phone terminal 10 as one held with the extension, thus making the most of such a stable, inexpensive line. When a call meant for the cellular phone terminal 10 is originated after the IP phone switching system 310 has detected a disconnection of the phone terminal 10 from the adapter 210 and then deleted the number of the phone terminal 10 from the storage, the call is successfully terminated at the phone terminal 10 via the public switched network 50.

Figure 6:
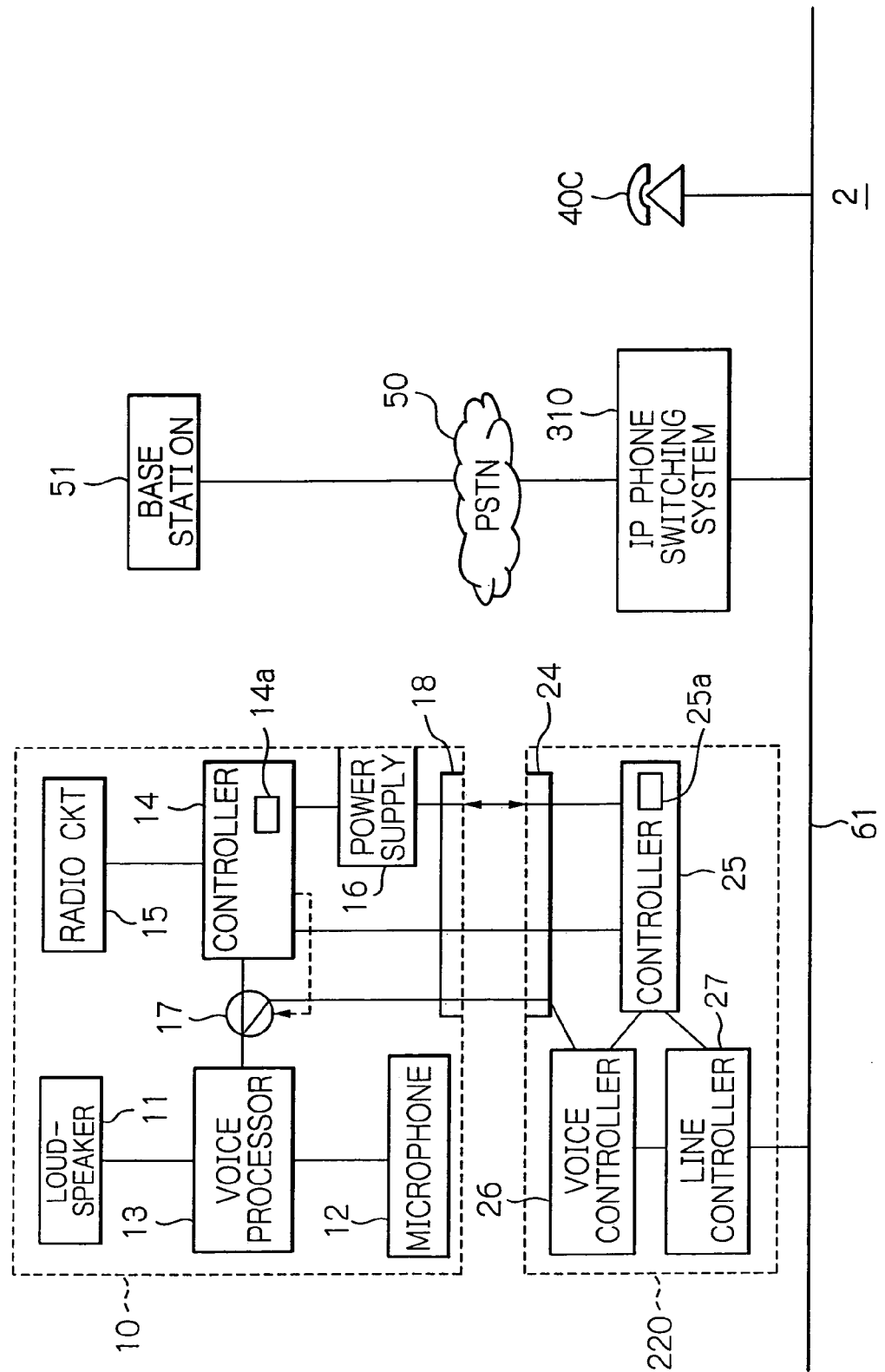
FIG. 6 is a schematic block diagram showing a second embodiment of the switching system in accordance with the present invention.

Reference will be made to FIG. 6 for describing an alternative, or second embodiment of the switching system in accordance with the present invention applied to an analog extension network. FIG. 6 shows the configurations of the cellular phone terminal 10 and adapter 210 included in the second embodiment. Structural parts and elements of FIG. 6 like those of FIG. 1 are designated by the identical reference numerals, and a detailed description thereof will not be made in order to avoid redundancy. The following description will concentrate on circuit arrangements unique to the alternative embodiment.

As shown in FIG. 6, a switching system, generally 2, includes a telephone switching system 310, an analog extension network 61 having its appearances interconnected to the telephone switching system 310, a conventional telephone set 40C and an adapter 220 also interconnected to the telephone switching system 310 and a public switched telephone network 50 further having its appearances interconnected to the telephone switching system 310 as well as the base station 51 connectable to the public switched network 50 and the cellular phone terminal 10. The cellular phone terminal 10 may be identical with that of the previous embodiment.

The adapter 220 includes a main controller 25, a voice controller 26, a line controller 27 and the connector 24 interconnected as illustrated and allows the cellular phone terminal 10 to be selectively connectable to the analog extension network 61. When the connector 18 of the cellular phone terminal 10 is coupled to the connector 24 of the adapter 220, the adapter 220 starts operating with power fed from the power supply 16 of the phone terminal 10.

The main controller 25 has the connection establishing function and number conversion registration requesting function like the controller 21 of the previous embodiment and is adapted to control the voice controller 26 and line controller 27. When the adapter 220 connects the cellular phone terminal 10, the controller 25 connects the voice controller 26 to the voice processor 13 of the phone terminal 10 for thereby allowing them to transfer speech signals between each other. The controller 25 also controls the line controller 27 to cause the latter to process signals transferred between the analog extension network 61 and the adapter 220.

The voice controller 26 transfers voice signals to and from the voice processor 13 of the cellular phone terminal 10 when the adapter 220 connects the phone terminal 10. More specifically, the voice controller 26 converts a digital voice signal received from the voice processor 13 to a corresponding analog voice signal and sends out the analog voice signal to the line controller 27. On the other hand, when an analog voice signal is input from the line controller 27 to the voice controller 26, the voice controller 26 digitizes the voice signal and sends out the resulting digital voice signal to the voice processor 13.

The line controller 27 plays the role of an interface between the adapter 220 and the analog extension network 61, i.e. a line circuit compatible with an analog telephone line. The line controller 27 has the functions of monitoring, e.g. the origination of a call addressed to the analog extension network 61 and of processing calls with the network 61, e.g. of sensing an originated call and sending a ringing. More specifically, the line controller 27 detects a call incoming from the telephone switching system 310 and receives speech signals in a control sequence while delivering them to the voice controller 26. Also, the line controller 27 sends out voice signals received from the voice controller 26 to the telephone switching system 310 via the analog extension network 61.

Figure 7:
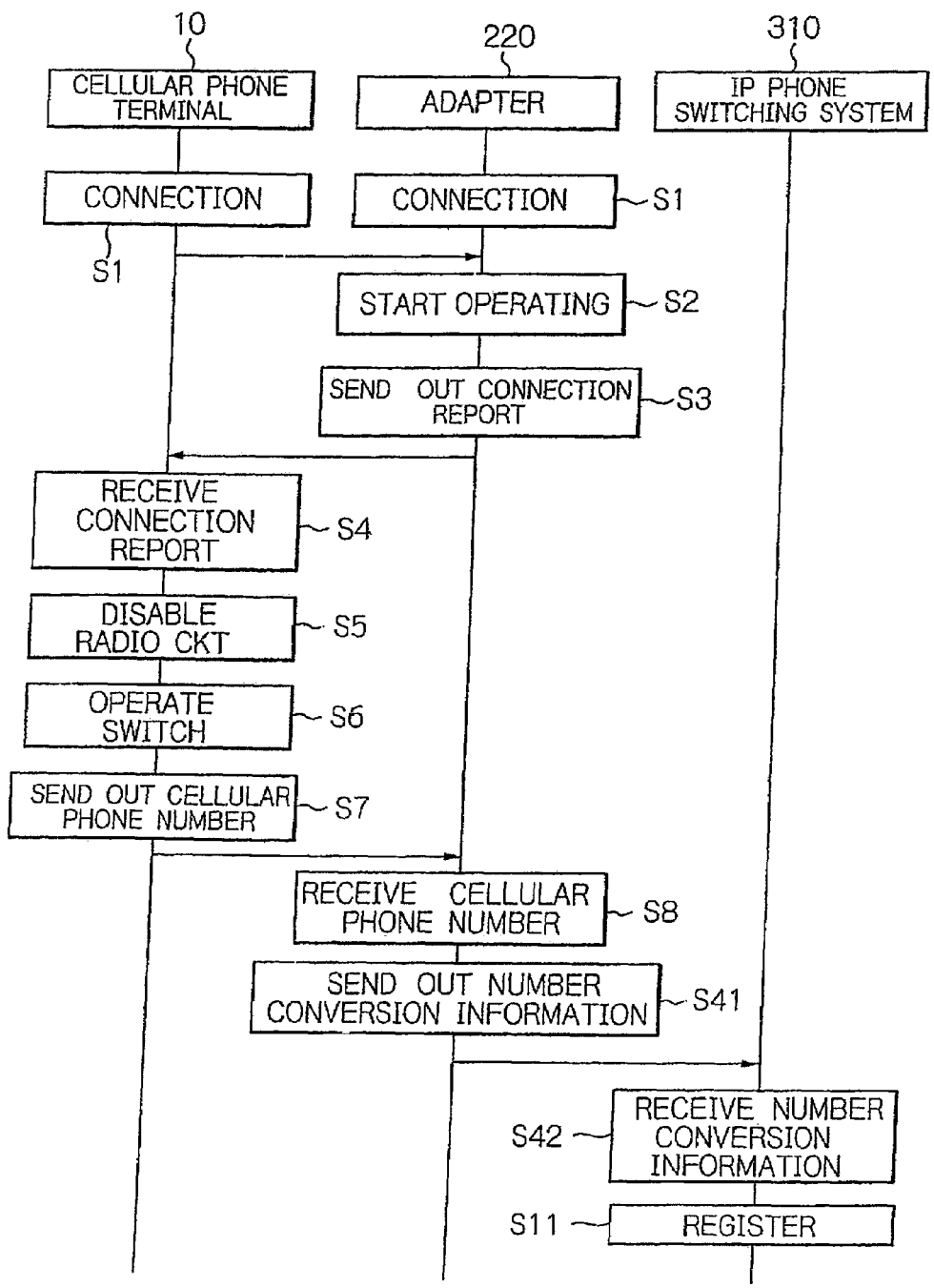
FIG. 7 is a flowchart useful for understanding a specific procedure to be executed by the second embodiment when a cellular phone set is connected to an adapter.

Specific operations of the illustrative embodiment will be described hereinafter. FIG. 7 demonstrates a specific procedure to be executed when the cellular phone terminal 10 is connected to the adapter 220. Because steps S1 through S8 shown in FIG. 7 are identical with the steps S1 through S7 shown in FIG. 3, the following description will concentrate on a procedure to follow the step S7.

As shown in FIG. 7, when the adapter 220 receives the cellular phone number output from the cellular phone terminal 10 (step S8), the controller 25 of the adapter 220 sends out number conversion information including at least an extension number assigned to the adapter 220, cellular phone number and registration validity information to the telephone switching system 310 via the line controller 27 (step S41). At this instant, the number conversion information is transmitted in a format adaptive to the analog line condition, e.g. in the form of calling a special number for reports or of modem signals. Upon receiving the number conversion information, the telephone switching system 310 registers the extension number and cellular phone number thereat while making them associated with each other (steps S42 and S11).

Figure 8:
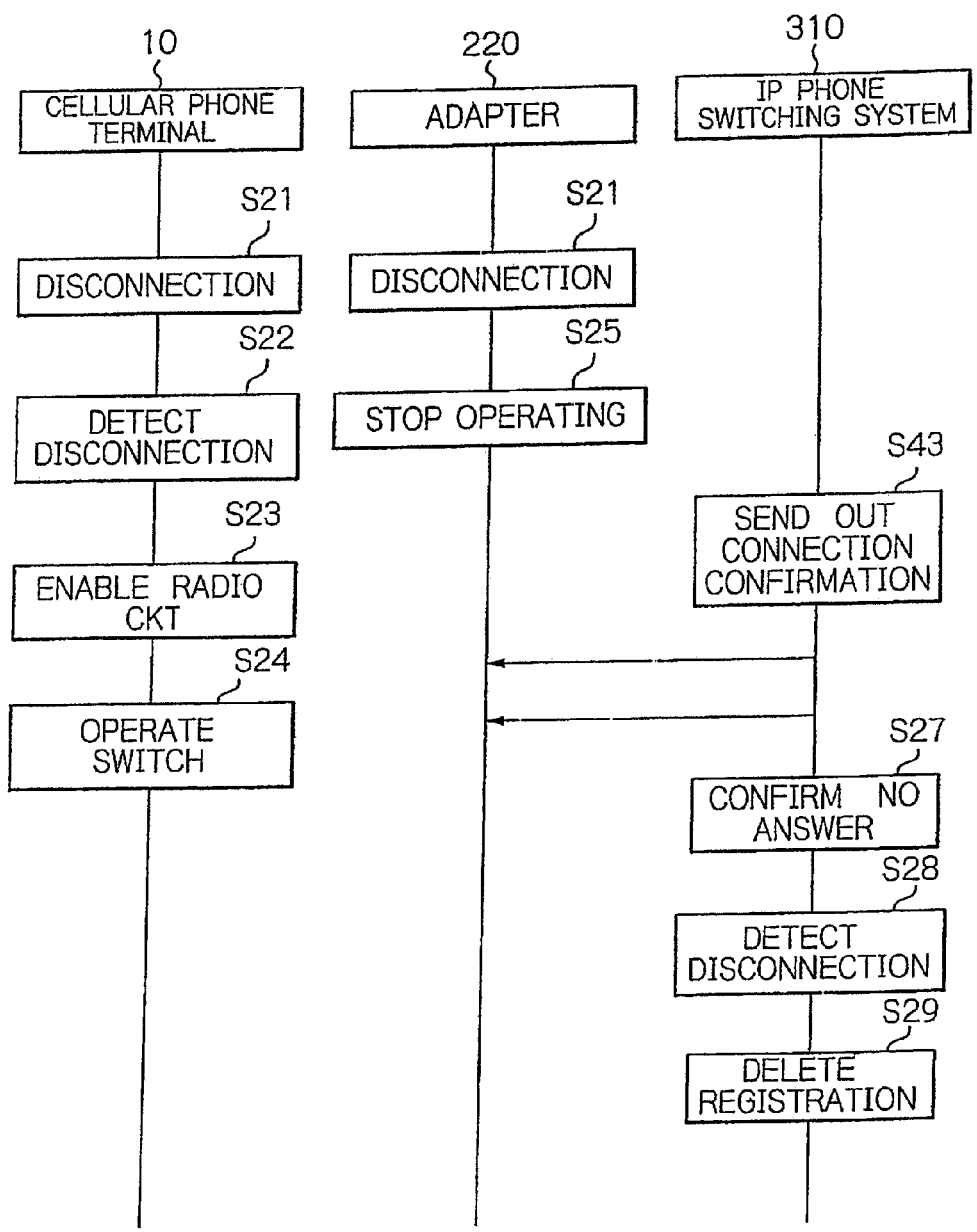
FIG. 8 is a flowchart useful for understanding a specific procedure to be executed by the second embodiment when the cellular phone set is disconnected from the adapter.

FIG. 8 shows a procedure to be executed when the cellular phone terminal 10 is disconnected from the adapter 220. Steps S21 through S25 shown in FIG. 8 are identical with the steps S21 through S25 of FIG. 4 and will not be described specifically in order to avoid redundancy. In the step S25 of FIG. 8, the adapter 220 stops operating. In a step S43, the telephone switching system 310 is sending out the connection confirmation report to the adapter 220 via the analog extension network 61 at predetermined intervals. The connection confirmation report may be conveyed in the form of modem signal by way of example.

If the adapter 220 does not return an answer signal to the telephone switching system 310, the telephone switching system 310 determines that the cellular phone terminal 10 is disconnected from the adapter 220 (steps S27 and S28). Thereafter, the telephone switching system 310 deletes the cellular phone number related to the adapter 220 (step S29).

Figure 9:
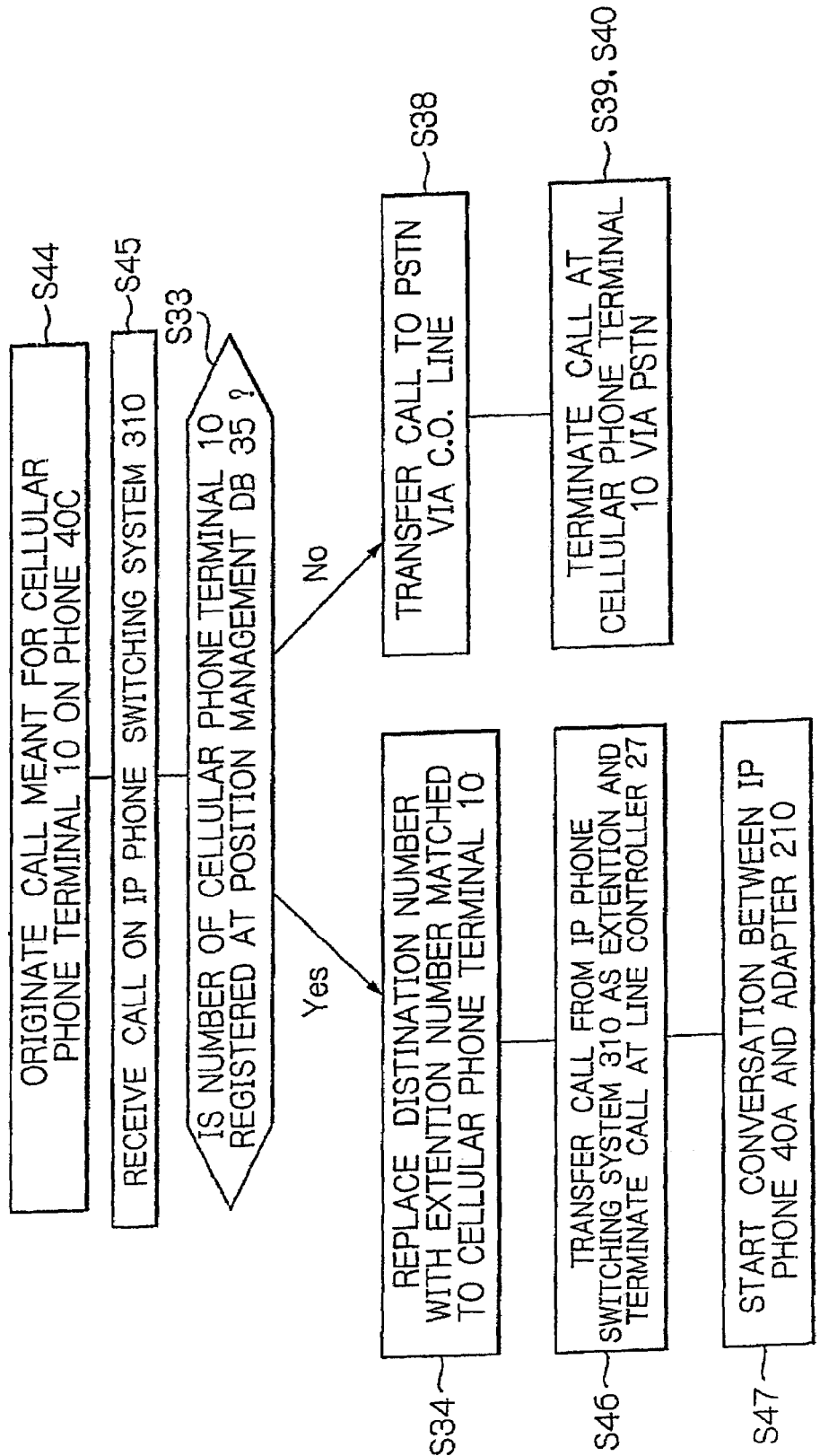
FIG. 9 is a flowchart useful for understanding a specific switching sequence particular to the second embodiment.

FIG. 9 shows a procedure to be executed when a call meant for the cellular phone terminal 10 is originated on the conventional telephone set 40C. As shown, when such a call is originated on the telephone set 40C (step S34), the call from the telephone set 40C is sensed by the telephone switching system 310 in a control sequence particular to the analog line condition (step S45). On receiving a dial number or selection signal from the telephone set 40C, the telephone switching system 310 searches the position management database 35 for a registration corresponding to the dial number received (step S33). If the received dial number is absent in the position management database 35 (No, step S33), steps S38 through S40 are executed which are identical with the steps S38 through S40 shown in FIG. 5.

If the received dial number is found out in the position management database 35 (Yes, step S33), then the telephone switching system 310 searches for an extension number associated with the cellular phone number thus found out and then substitutes the extension number for the destination number or dial number (step S34). The telephone switching system 310 then calls the adapter 220 corresponding to the above extension number (step S46). At this instant, the line controller 27 of the adapter 220 executes the control sequence of the analog line condition between the adapter 220 and the telephone switching system 310. Subsequently, upon the call connection established, speech signals incoming from the telephone switching system 310 are sent out to the voice controller 26 via the line controller 27 and digitized thereby. Thereafter, the voice controller 26 transmits the speech signals to and from the voice processor 13 of the cellular phone terminal 10 (step S47).

As stated above, in the illustrative embodiment, the interface of the adapter 220 associated with the network is changed adaptive to the analog telephone network, so that an incoming call addressed to the cellular phone terminal 10 can be terminated at the phone terminal 10 via an extension, i.e. without the intermediary of the public switched network 50. Stated another way, a calling person is allowed to automatically use a less expensive line without intentionally selecting it.

A further alternative, or third embodiment of the switching system in accordance with the present invention will be described with reference to FIG. 10. As shown, an switching system, generally 3, includes an IP phone switching system 310, a personal computer (PC) 70 and an IP phone set 40 accommodated in the IP phone switching system 310, an adapter 230 connectable to the personal computer 70, and the cellular phone terminal 10 connectable to the IP phone switching system 310 when connected to the adapter 230. The third embodiment may be the same as the first embodiment except that the adapter 230 is connectable to the personal computer 70 having software serving an IP phone function installed therein and that, when the cellular phone terminal 10 is connected to the adapter 230, the personal computer 70 can obtain cellular phone information stored in the phone terminal 10. Let the software serving the IP phone function be referred to as a software IP phone hereinafter.

More specifically, the personal computer 70, interconnected to the IP phone switching system 310, comprises a general personal computer, PDA or similar data processing terminal device and includes software 71 functioning as an IP phone and readable by or runnable on its processor system including a CPU or similar controller, not shown. The personal computer 70 therefore serves as an IP phone accommodated in the IP phone switching system 310. Further, when the cellular phone terminal 10 is connected to the adapter 230, the personal computer 70 is capable of obtaining cellular phone information stored in the phone terminal 10. On receiving a number conversion request from the adapter 230 together with the cellular phone information, the personal computer 70 identifies the cellular phone number included in the cellular phone information and then sends out number conversion information to the IP phone switching system 310.

The cellular phone information stored in the cellular phone terminal 10 may include the phone number assigned to the phone terminal 10, incoming call history, transmission history, a telephone directory, received mail history, transmitted mail history and personal schedule information by way of example.

With the above configuration, the personal computer 70 can thus obtain and use the cellular phone information to communicate with the cellular phone terminal 10 in accordance with the information. In addition, the personal computer 70 can delete, change, add or otherwise edit the cellular phone information and write in the resulting edited information into the cellular phone terminal 10.

The adapter 230 allows, when connected to the cellular phone terminal 10, the phone terminal 10 to be interconnected to the IP phone switching system 310 as well as to the personal computer 70. In the illustrative embodiment, the adapter 230 is adapted to be directly connected to the personal computer 70. However, the adapter 230 may be an independent unit communicable with a specific personal computer 70 over the extension network 60.

Figure 10:
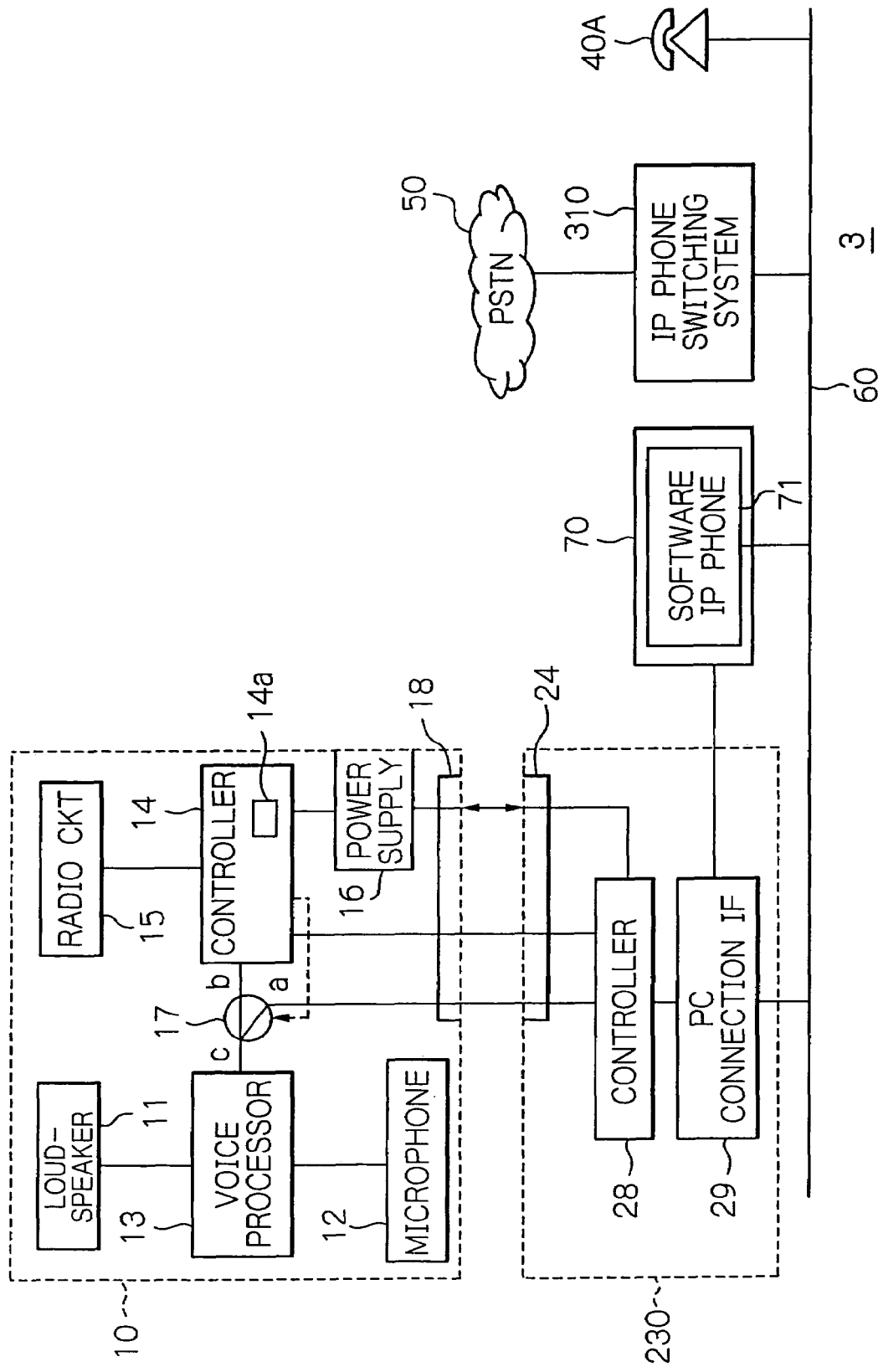
FIG. 10 is a schematic block diagram showing a third embodiment of the switching system in accordance with the present invention.

As shown in FIG. 10, the adapter 230 includes at least a main controller 28 and a personal computer interface 29 interfacing the adapter 230 with the personal computer 70. When the cellular phone terminal 10 is connected to the adapter 230, the main controller 28 communicates with the voice processor 13 of the phone terminal 10 and receives operation commands from the controller 14 of the phone terminal 10. Further, on receiving the cellular phone information from the controller 14 of the cellular phone terminal 10, the controller 28 delivers the information to the personal computer 70 via the personal computer interface 29 together with the number conversion request.

Figure 11:
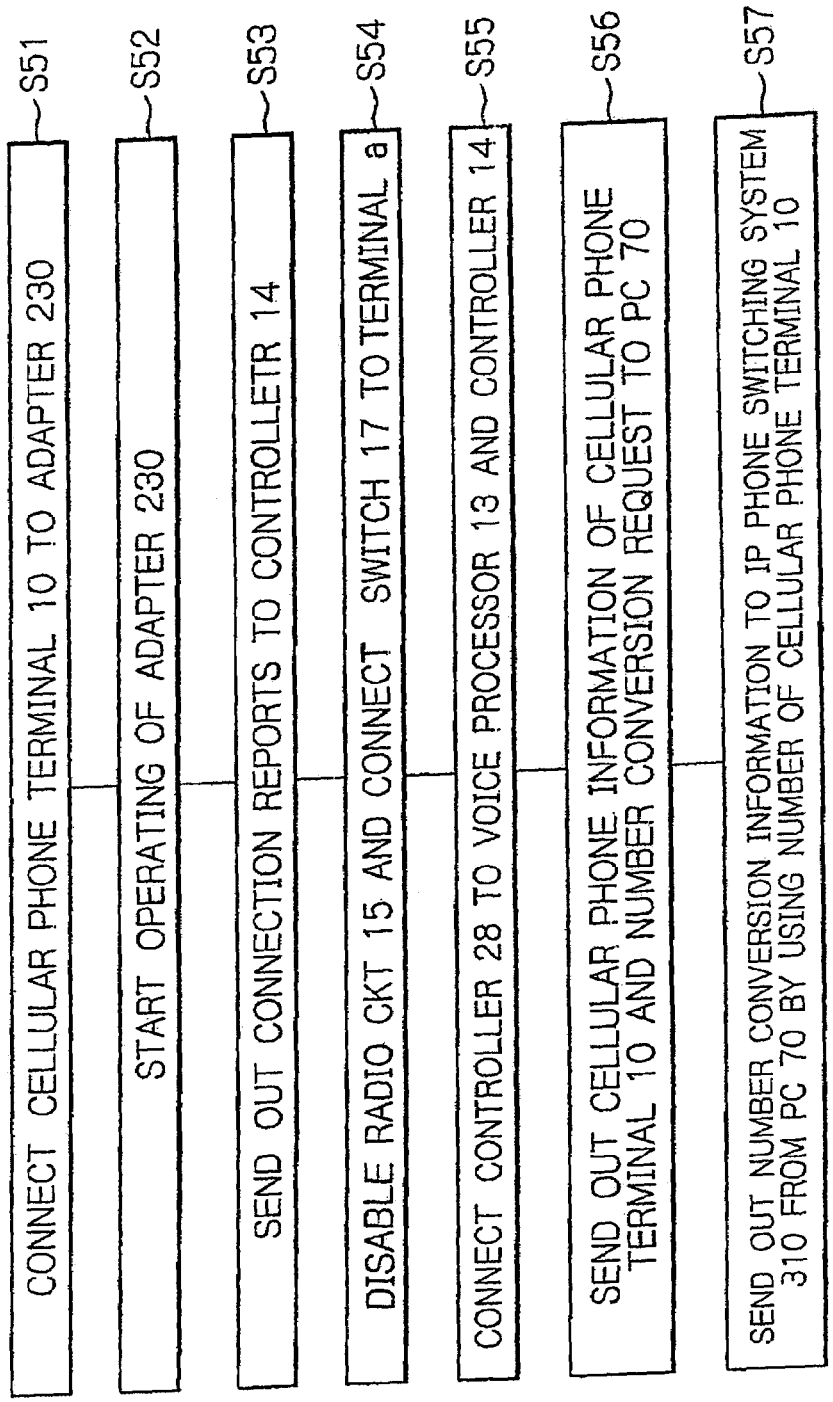
FIG. 11 is a flowchart useful for understanding a connection procedure of a cellular phone set to an adapter and an information registration procedure unique to the third embodiment.

Specific operations of the third embodiment will be described hereinafter. FIG. 11 demonstrates a procedure to be executed when the cellular phone terminal 10 is connected to the adapter 230. As shown, when the cellular phone terminal 10 is connected to the adapter 230 via the connectors 18 and 24 (step S51), the adapter 230 starts operating with power being fed from the power supply 16 of the phone terminal 10 (step S52). At this instant, the controller 28 of the adapter 230 sends out a connection report to the controller 14 of the cellular phone terminal 10 (step S53). In response, in the cellular phone terminal 10, the controller 14 disables the radio circuit 15 and causes the switch 17 to connect its terminal c to its terminal a (S54). Consequently, the controller 28 of the adapter 230 connects the voice processor 13 with the controller 14 of the cellular phone terminal 10 (step S55).

After the step S55, the cellular phone information stored in the controller 14 of the cellular phone terminal 10 is delivered to the controller 28 of the adapter 230. The controller 28, in turn, sends out the cellular phone information and a number conversion request to the personal computer 70 (step S56). In response, the personal computer 70 separates a cellular phone number included in the cellular phone information and then sends out number conversion information to the IP phone switching system 310. Consequently, the IP phone switching system 310 registers the cellular phone number and an extension number assigned to the personal computer 70 thereat while relating them to each other (step S57). Such a registering method is identical with the method described in relation to the first embodiment and will not be described specifically.

The personal computer 70 can obtain the cellular phone information from the adapter 230 and can therefore use the information on the basis of its IP phone function.

Figure 12:
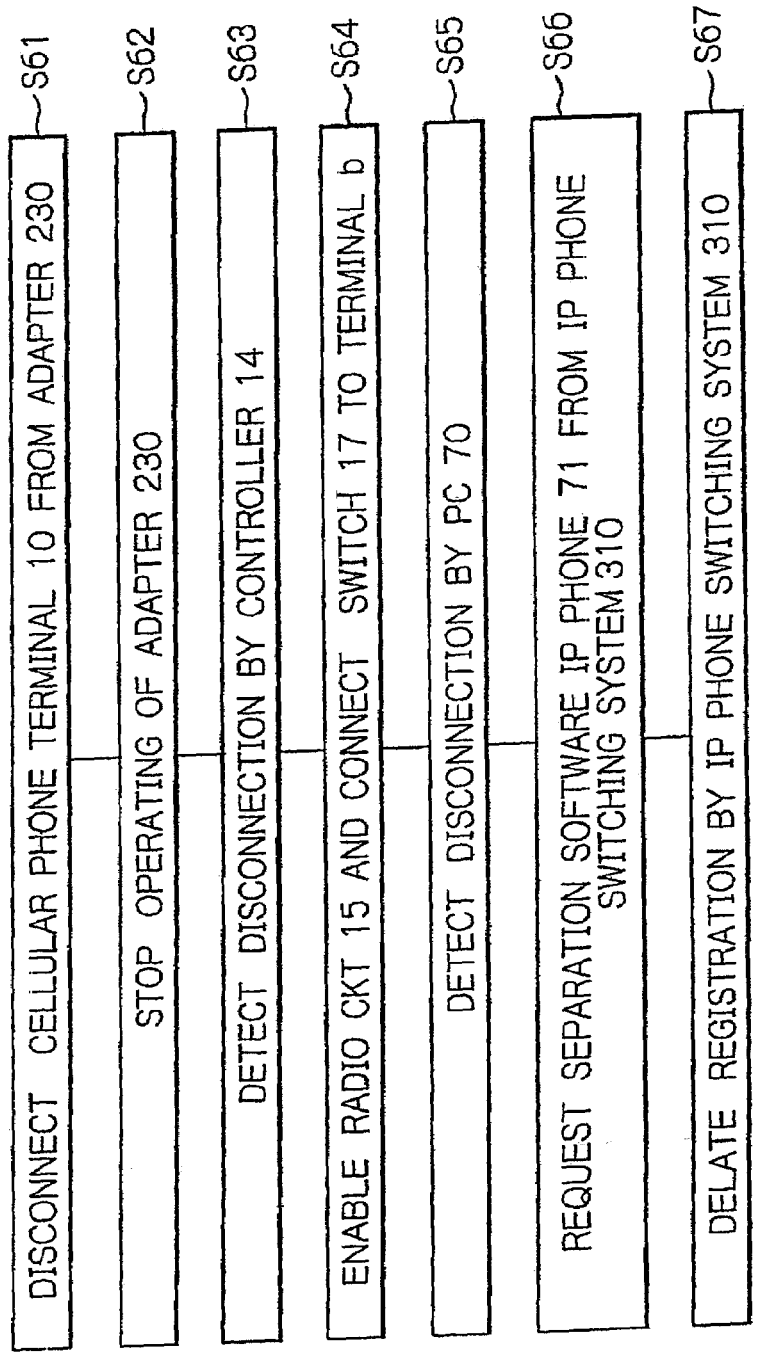
FIG. 12 is a flowchart useful for understanding a disconnection procedure of the cellular phone set from the adapter and an information deletion procedure also unique to the third embodiment.

FIG. 12 shows a procedure to be executed when the cellular phone terminal 10 is disconnected from the adapter 230. As shown, when the cellular phone terminal 10 is removed from the adapter 230 (step S61), the adapter 230 stops operating due to the shut off of the power supplied from the power supply 16 of the phone terminal 10 (step S62). On the other hand, the controller 14 of the cellular phone terminal 10, now unable to communicate with the controller 28 of the adapter 230, determines a disconnection to the adapter 230 (step S63), and again enables the radio circuit 15 and causes the switch 17 to connect its terminal c to its terminal b (step S674).

The personal computer 70, unable to communicate with the adapter 230 that having stopped operating, determines that the cellular phone terminal 10 is disconnected from the adapter 230 (step S65). Subsequently, a separation request is sent out from the software IP phone 71 of the personal computer 70 to the IP phone switching system 310 in order to request the IP phone switching system 310 to delete the cellular phone number matched to the extension number of the personal computer 70 (step S66). In response, the IP phone switching system 310 deletes the cellular phone number registered from the position management database 35 (step S67).

Figure 13:
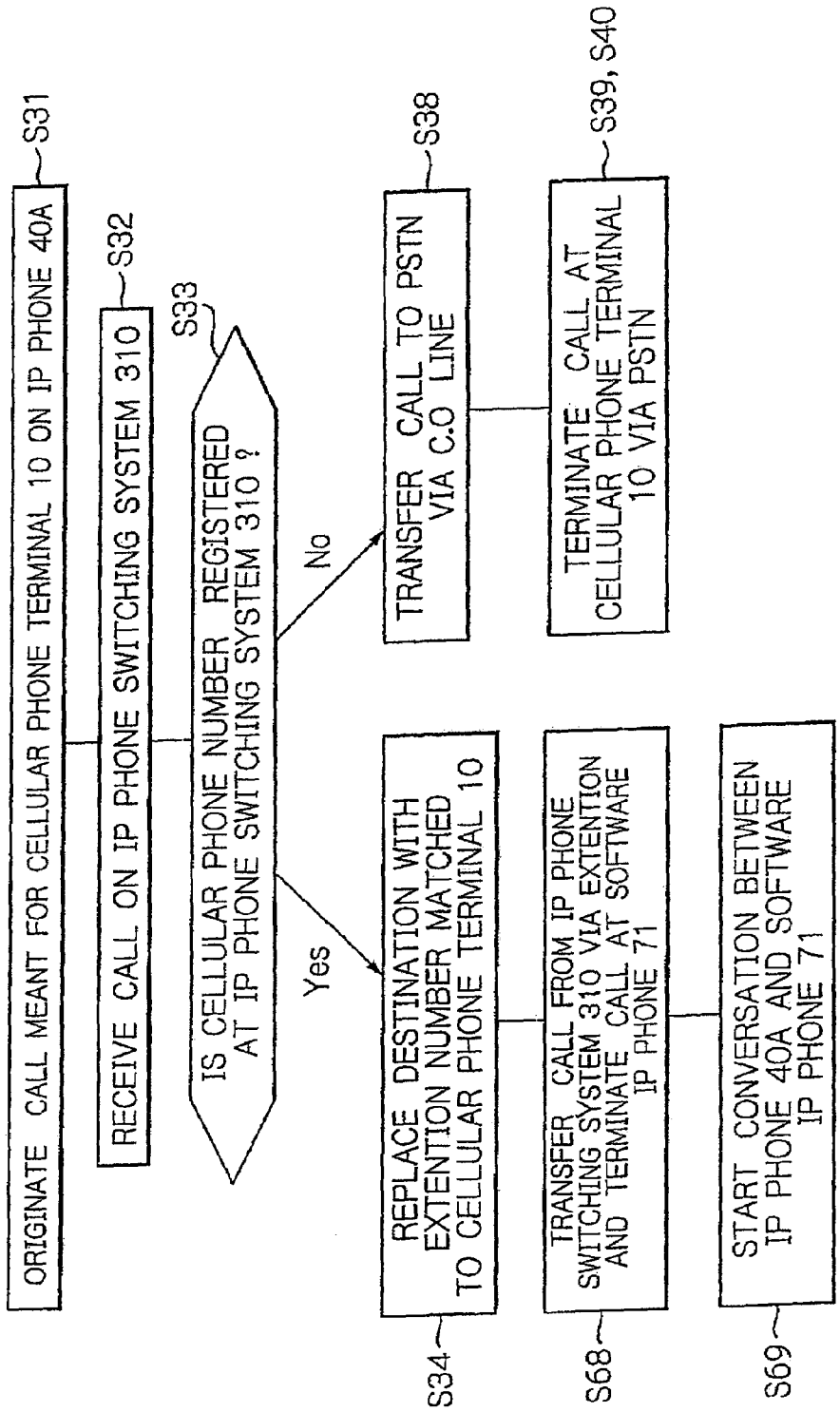
FIG. 13 is a flowchart useful for understanding a specific switching sequence available with the third embodiment.

FIG. 13 shows a procedure to be executed when a call meant for the cellular phone terminal 10 is originated on the IP phone set 40A. As shown, when a call meant for the cellular phone terminal 10 registered at the IP phone switching system 310 is originated on the IP phone set 40A (steps S31 and S32), the IP phone switching system 310 determines whether or not the cellular phone number or destination is registered at the position management database 35 (step S33). If the answer of the step S33 is No, meaning that the appropriate cellular phone number is absent in the position management database 35, the IP phone switching system 310 switches the call to the public switched network 50 (step S38). As a result, the call is terminated at the cellular phone terminal 10 by way of the public switched network 50 (steps S39 and S40).

If the answer of the step S33 is Yes, meaning that the cellular phone number is present in the position management database 35, the IP phone switching system 310 reads out the extension number matched to the cellular phone number thus searched for, substitutes the above extension number for the destination number, and then continues the call processing (step S34) via the extension. As a result, the call is terminated at the software IP phone 71 on the extension (step S68), so that conversation may begin to be held between the IP phone set 40A and the software IP phone 71 (step S69). At this instant, the software IP phone 71 is capable of transferring speech signals to and from the voice controller 13 of the cellular phone terminal 10 via the adapter 230.

As stated above, in the illustrative embodiment, only if the adapter 230 is connected to the personal computer 70, the software IP phone 71 included in the personal computer 70 allows a call to be terminated at the cellular phone terminal 10 without being routed through the public switched network 50. This also allows a calling person to automatically use a less expensive line without intentionally selecting it. In addition, when a call is originated on the software IP phone 71, the phone 71 can retrieve and use various kinds of information stored in the cellular phone terminal 10, e.g. a telephone directory, and transmission and receipt histories.

Figure 14:
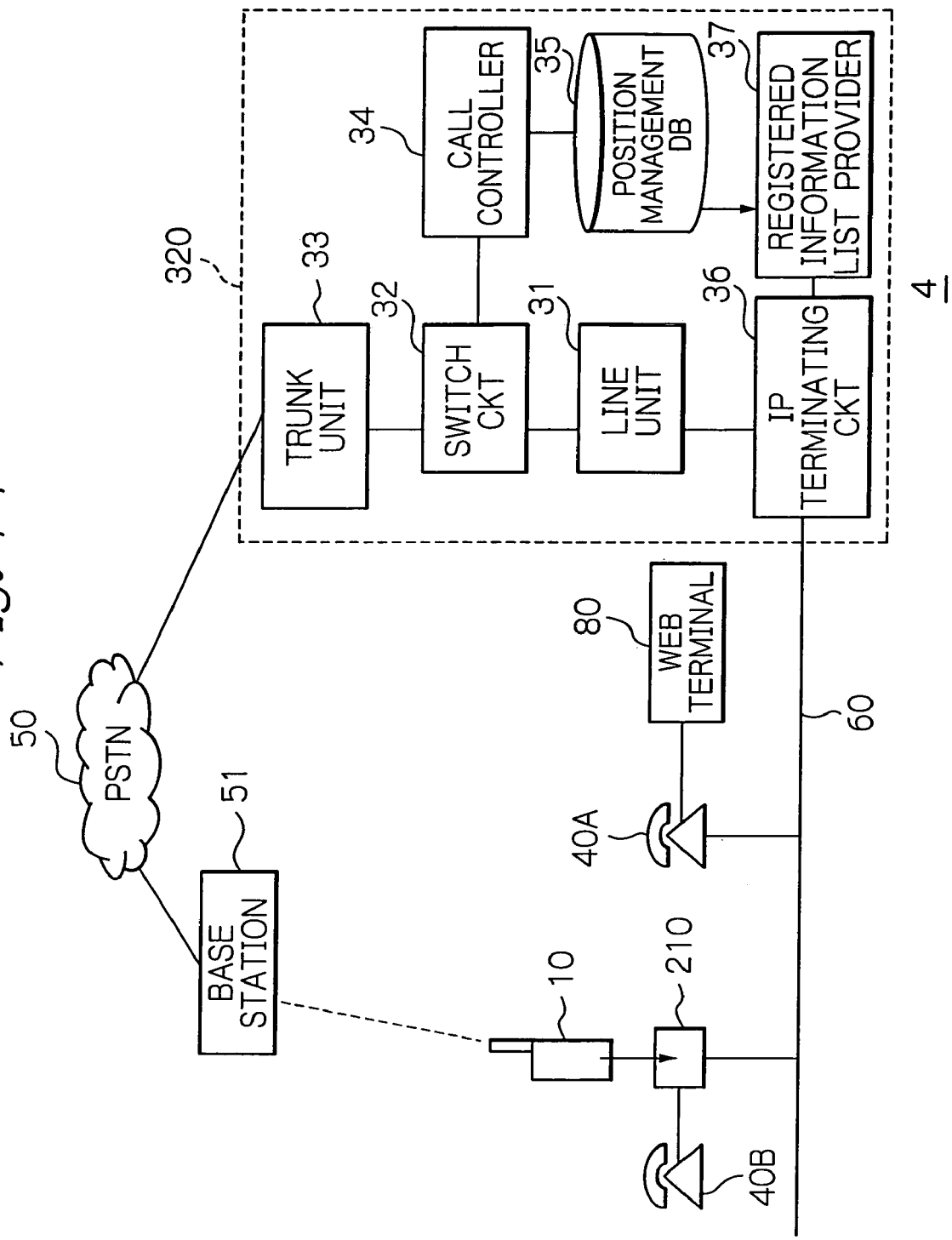
FIG. 14 is a schematic block diagram showing a fourth embodiment of the switching system in accordance with the present invention.

Referring to FIG. 14, a still further alternative, or fourth embodiment of the switching system, generally 4, will be described in accordance with the present invention. As shown, the fourth embodiment may be the same as the first embodiment except that an IP phone switching system 320 additionally includes a registered information list provider 37 configured to provide a web terminal 80, which is interconnected to the switching system 320, with a list of information registered in the position management database 35. The adapter 210 and IP phone sets 40A and 40B are also interconnected to the IP phone switching system 320.

The registered information list includes management information registered in the position management database 35 and may include cellular phone numbers, user IDs (IDentifications) associated with cellular phone terminals and extension numbers to which the cellular phones are connectable.

The registered information provider 37 may be implemented as a web server including a control circuit having a data processing capability. The registered information provider 37 is capable of reading out, in response to a request from the web terminal 80, the registered information list registered at the position management database 35 and capable of converting the above list to data of HTML (Hyper Text Markup Language) or similar text format before sending it out to the web terminal 80. It is to be noted that, by the registered information provider 37, the registered information list thus converted to data of text format is sent out to the web terminal 80 via the IP accommodating circuit 36.

Figure 15:
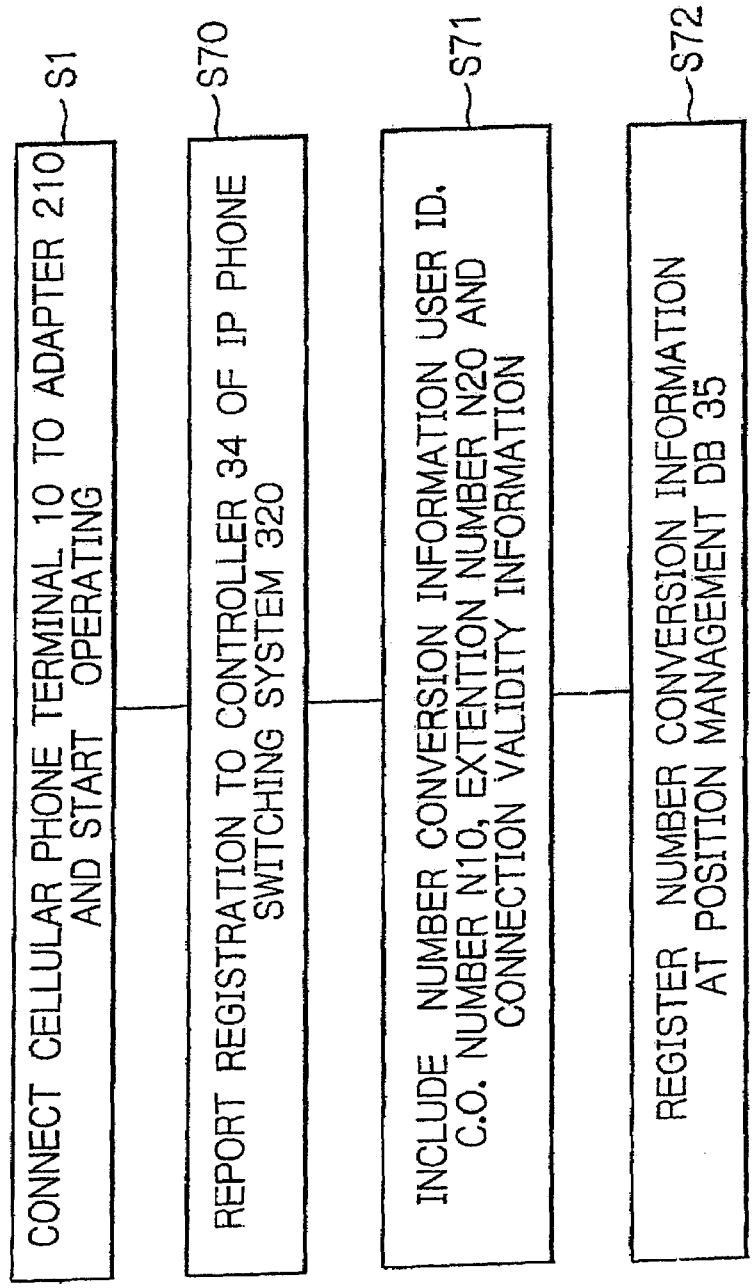
FIG. 15 is a flowchart useful for understanding a connection procedure of a cellular phone set to an adapter and an information registration procedure unique to the fourth embodiment.

Specific operations of the illustrative embodiment will be described hereinafter. FIG. 15 demonstrate show the IP phone switching system 320 registers number conversion information thereat when the cellular phone terminal 10 is connected to the adapter 210. In this case, the cellular phone terminal 10 and adapter 210 operate in exactly the same manner as in the first embodiment and will not be described specifically.

As shown in FIG. 15, when the cellular phone terminal 10 is connected to the adapter 210, the adapter 210 starts operating (step S1) and sends number conversion information to the IP phone switching system 320 (step S70). In the illustrative embodiment, the number conversion information includes the extension number of the adapter 210 or that of the IP phone set 40B, the cellular phone number of the cellular phone terminal 10 connected to the adapter 210, connection validity information and user ID information particular to the phone terminal 10, as shown in a step S71 in FIG. 15. The user ID information may include a name and an employee number or similar ID number identifying the user of the cellular phone terminal 10.

On receiving the number conversion information, the call controller 34 included in the IP phone switching system 320 registers the information at the position management database 35 (step S72). Information including the user ID information is thus registered in the position management database 35.

Figure 16:
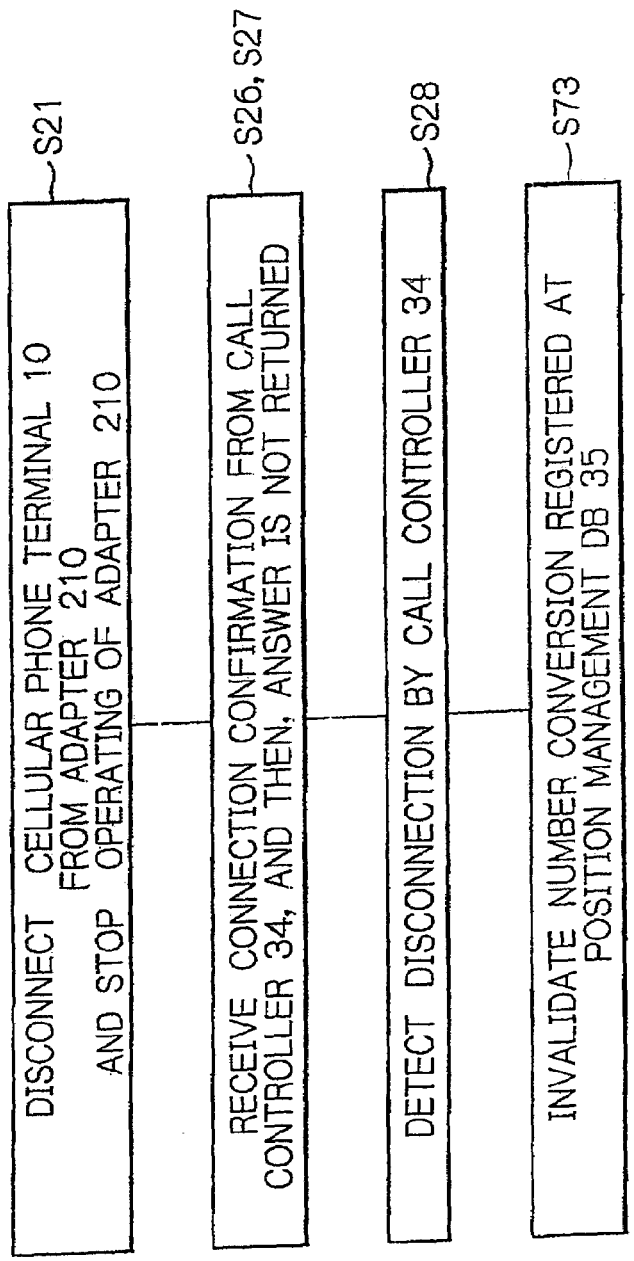
FIG. 16 is a flowchart useful for understanding a disconnection procedure of the cellular phone set from the adapter and an information invalidation procedure unique to the fourth embodiment.

FIG. 16 shows how the IP phone switching system 320 operates when the cellular phone terminal 10 is disconnected from the adapter 210. In this case, too, the cellular phone terminal 10 and adapter 210 operate in the same manner as with the first embodiment and will not be described specifically. As shown, whenever the cellular phone terminal 10 is removed from the adapter 210, the adapter 210 stops operating (steps S21 and S25). If the adapter 210 does not return an answer signal to the connection confirmation report sent from the IP phone switching system 320 at preselected intervals, the switching system 320 determines that the cellular phone terminal 10 is disconnected from the adapter 210 (steps S26 through S28). More specifically, on detecting the disconnection of the phone terminal 10 from the adapter 210, the call controller 35 does not delete the registered information, but renders the number conversion invalid (step S73). This makes number conversion not necessary while preserving the registered information.

Figure 17:
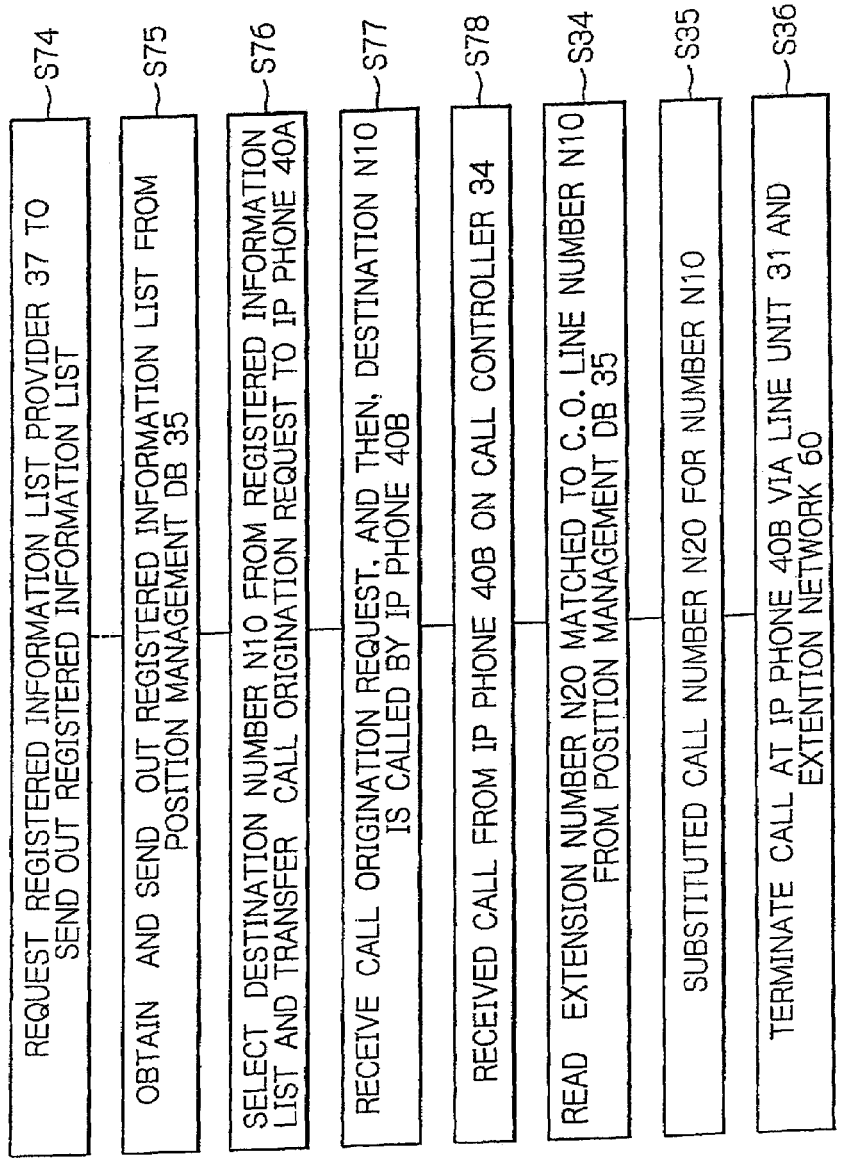
FIG. 17 is a flowchart useful for understanding a specific switching sequence available with the fourth embodiment.

FIG. 17 shows a procedure to be executed when a person originates a call meant for the cellular phone terminal 10 on the IP phone set 40A. As shown, the web terminal 80 requests the registered information list provider 37 to provide the registered information list in response to the caller's operation (step S74). In response, the registered information list provider 37 reads out the entire registered information list registered in the position management database 35, converts the list to data of HTML format by way of example, and then sends out the list to the web terminal 80 via the IP accommodating circuit 36 (step S75). In the illustrative embodiment, assume that the registered information list includes the phone number N10 of the cellular phone terminal 10, user ID information and the extension number N20 of the adapter 210 or IP phone set 40B.

After the step S75, the web terminal 80 receives the registered information list from the registered information list provider 37 and displays it on its screen, not shown. The caller, watching the user ID information and cellular phone numbers, or subscriber telephone numbers, displayed on the web terminal 80, selects an appropriate cellular phone number or telephone number N10 of his or her desired destination. In response, the web terminal 80 gives the cellular phone number N10 to the IP phone set 40A and then sends out a call origination request to the IP phone set 40A. In response, the IP phone set 40A originates a call towards the cellular phone terminal 10 (step S77).

In the IP phone switching system 320, the call controller 14 receives the call from the IP phone set 40A (step S78). At this instant, the cellular phone number N10 is present in the position management database 35. The call controller 34 reads out an extension number P, which is N20 in this case, related to the subscriber telephone number N10 from the position management database 35, substitutes the extension number P for the destination number, and then handles the above call as one addressed to an extension. In this manner, the illustrative embodiment, like the first embodiment, establishes a call connection between the line unit 31 and the IP phone set 40A and thus allows speech signal transmission to and from the cellular phone terminal 10 via the adapter 210.

As stated above, the illustrative embodiment includes the web terminal 80 and registered information list provider 37, which is disposed in the IP phone switching system 320, in addition to the circuits of the first embodiment. Therefore, when a call addressed to the cellular phone terminal 10 is originated on the IP phone set 40A, an extension or an outside line can be selected by the same phone number, i.e. the cellular phone number N10. In addition, a registered destination number can be selected by a simpler method using the web terminal 80 in the event of the origination of a call.

Figure 18:
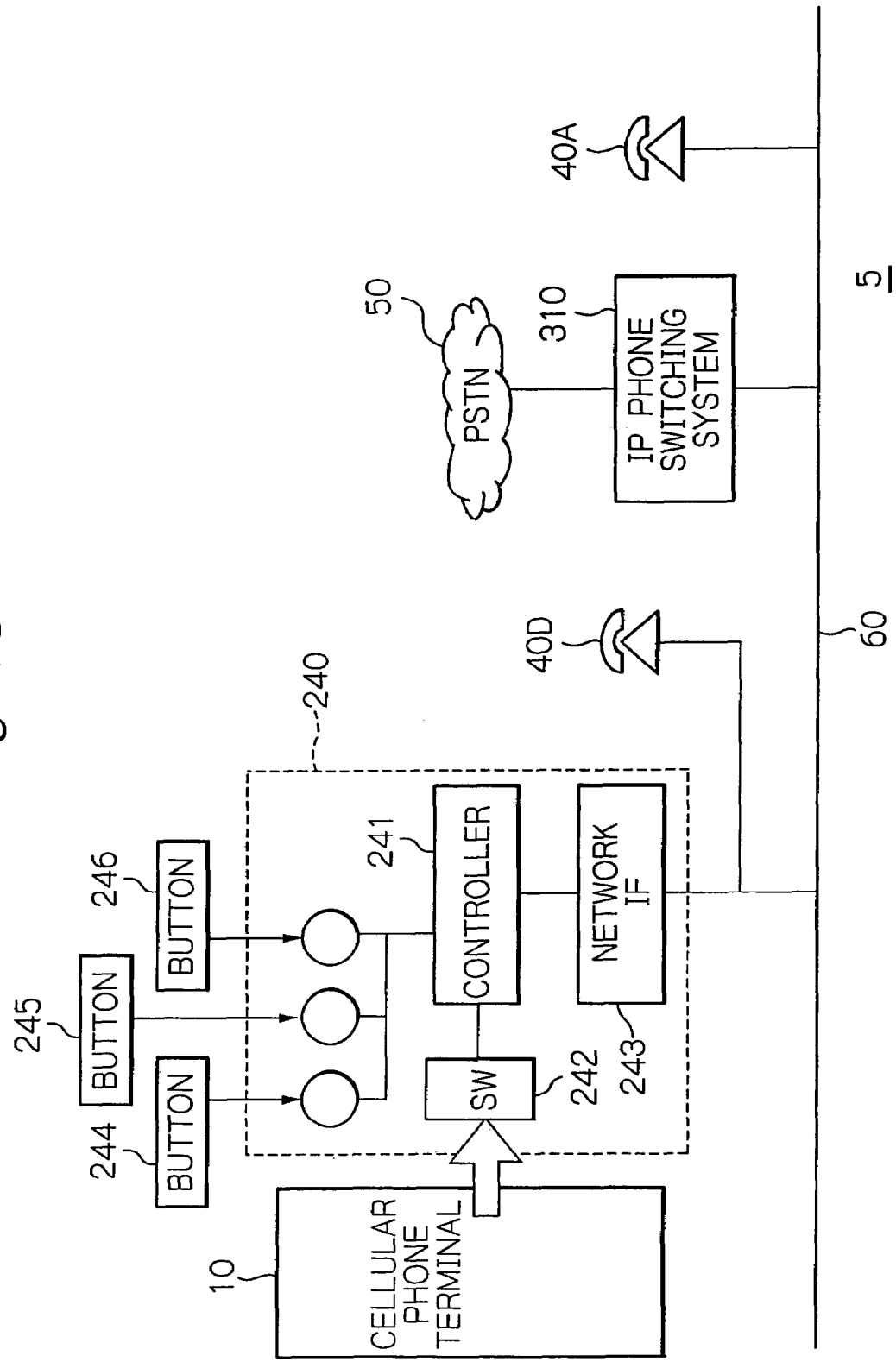
FIG. 18 is a schematic block diagram showing a fifth embodiment of the switching system in accordance with the present invention.

Reference will be made to FIG. 18 for describing still another alternative, or fifth embodiment of the switching system, generally 5, in accordance with the present invention. As shown, the fifth embodiment is identical with the first embodiment except for the configuration of an adapter 240, which corresponds to the adapter 210, FIG. 1. In FIG. 18, parts and elements like those shown in FIG. 1 are designated by the identical reference numerals, and a detailed description thereof will not be made in order to avoid redundancy.

The adapter 240, accommodated in the IP phone switching system 310 via the extension network 60, is connectable to one or more cellular phone sets 10 and one or more IP phone sets 40D although one cellular phone set 10 and one IP phone set 40D are specifically shown in FIG. 18. In the illustrative embodiment, after connecting the cellular phone terminal 10 to the adapter 240, the user of the phone terminal 10 is allowed to transfer an incoming call terminated on the phone terminal 10 to the IP phone set 40D, as desired.

More specifically, in FIG. 18, the adapter 240 includes a controller 241, a switch (SW) 242, a network interface 243 and buttons 244, 245 and 246 interconnected as shown. While a single switch 242 is shown in FIG. 18, the adapter 240 includes a plurality of switches corresponding in number to the cellular phones 10. Likewise, the three buttons 244, 245 and 246 are provided correspondingly in number to the IP phone sets 40D to which an incoming all can be selectively transferred.

The switch 242 also has the function of connector, to which the cellular phone terminal 10 is connectable. When the user of the cellular phone terminal 10 settles the phone terminal 10 on the adapter 240, the connection of the phone terminal 10 causes the switch 242 to be set with the result that the switch 242 feeds a set report to the controller 241.

The buttons or keys 244, 245 and 246, each corresponding to a particular IP phone set 40D, are lockable switches used to designate a destination or IP phone set 40D to which a call terminated at the cellular phone terminal 10 should be transferred. More specifically, when the user, having set the cellular phone terminal 10 to the switch 242, pushes desired one of the buttons 244, 245 and 246, the cellular phone terminal 10 is brought into correspondence with one IP phone set 40D designated by the button pushed as to an incoming call that will be terminated at the phone terminal 10 later. On receiving the set report from the switch 242, the controller 241 detects that the phone terminal 10 is settled into the switch 242. Whenever an incoming call is thereafter to be terminated on the cellular phone set 10, the controller 241 determines which of the buttons 244, 245 and 246 is depressed by the user and recognizes the IP phone set 40D designated by the button depressed as a destination to which the call is to be transferred.

The controller 241 receives the cellular phone number of the cellular phone terminal 10 settled on the switch 242 and in turn sends out number conversion information to the IP phone switching system 310 via the network interface 243. In the illustrative embodiment, the number conversion information includes information representative of the destination of transfer designated by one of the buttons 244, 245 and 246 (transfer destination information hereinafter) in addition to the cellular phone number, extension number and connection validity information. This allows the IP phone switching system 310 to register the cellular phone number and transfer destination information at the position management database 35, while relating them to the extension number of the adapter 240 for thereby designating the destination of transfer.

Figure 19:
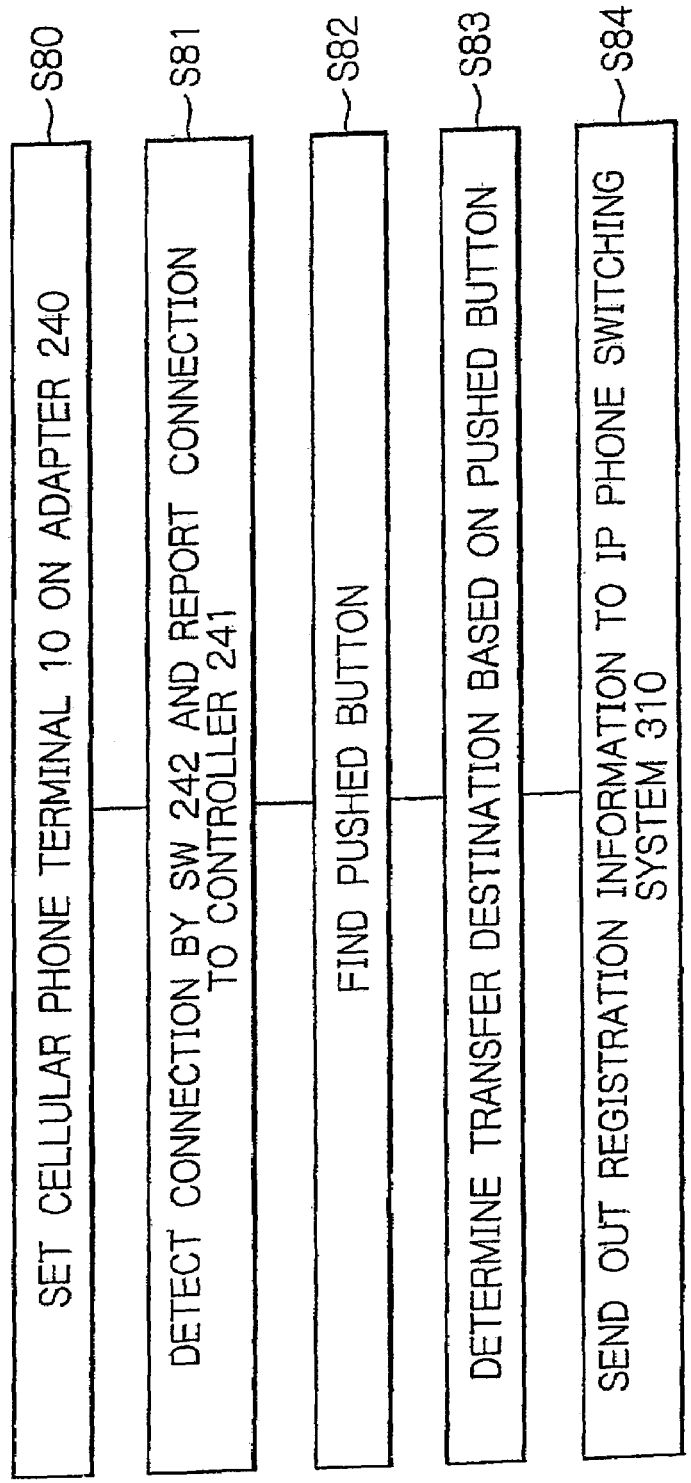
FIG. 19 is a flowchart useful for understanding a connection procedure of a cellular phone set to an adapter particular to the fifth embodiment.

Specific operations of the illustrative embodiment will be described hereinafter. FIG. 19 shows how the illustrative embodiment registers number conversion information when the cellular phone is settled on the adapter 240. As shown, when the user settles the cellular phone terminal 10 on the adapter 210, the switch 242 is pressed by, e.g. the weight of the phone terminal 10 and delivers a set report to the controller 241 (step S81), allowing the controller 241 to detect the settlement of the phone terminal 10 to the adapter 210. Subsequently, when the user pushes desired one of the buttons 244, 245 and 246, the controller 241 detects the button pushed by the user (step S82) and recognizes, in this example, one IP phone set 40D designated by the above button as a destination of transfer (step S83).

Subsequently, the controller 241 sends out number conversion information including at least the cellular phone number of the cellular phone terminal 10, transfer destination information including the number of the IP phone set 40D, extension number and connection validity information to the IP phone switching system 310 via the network interface 243 (step S84), as stated earlier. In response, the IP phone switching system 310 registers the cellular phone number and transfer destination number at the position management database 35 while matching them to the extension number.

Figure 20:
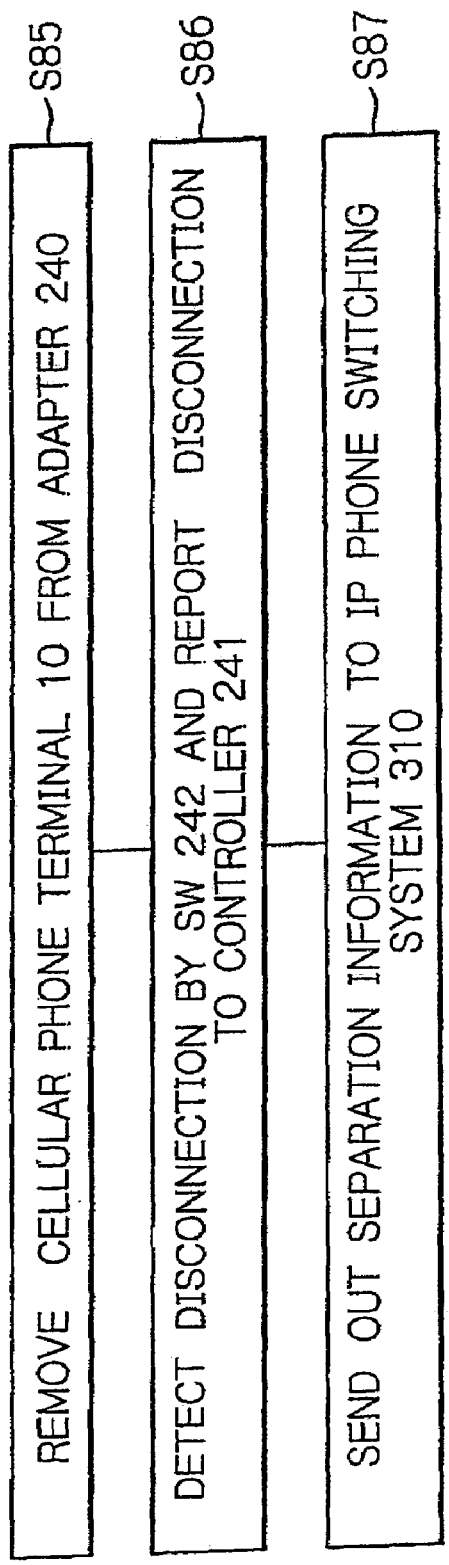
FIG. 20 is a flowchart useful for understanding a disconnection procedure of the cellular phone set from the adapter also particular to the fifth embodiment.

FIG. 20 shows a procedure to be executed when the cellular phone terminal 10 is removed from the adapter 240. As shown, when the cellular phone terminal 10 is removed from the switch 242 (step S85), the switch 242 feeds a disconnection report to the controller 241. In response, the controller 241 determines that the cellular phone terminal 10 is disconnected from the adapter 240 (step S86), and then sends out a deletion request to the IP phone switching system 310 for requesting it to delete the cellular phone number registered at the position management database 35 (step S87). On receiving the deletion request, the IP phone switching system 310 deletes from the database 35 the cellular phone number and transfer destination information registered in correspondence to the extension number of the adapter 240.

Figure 21:
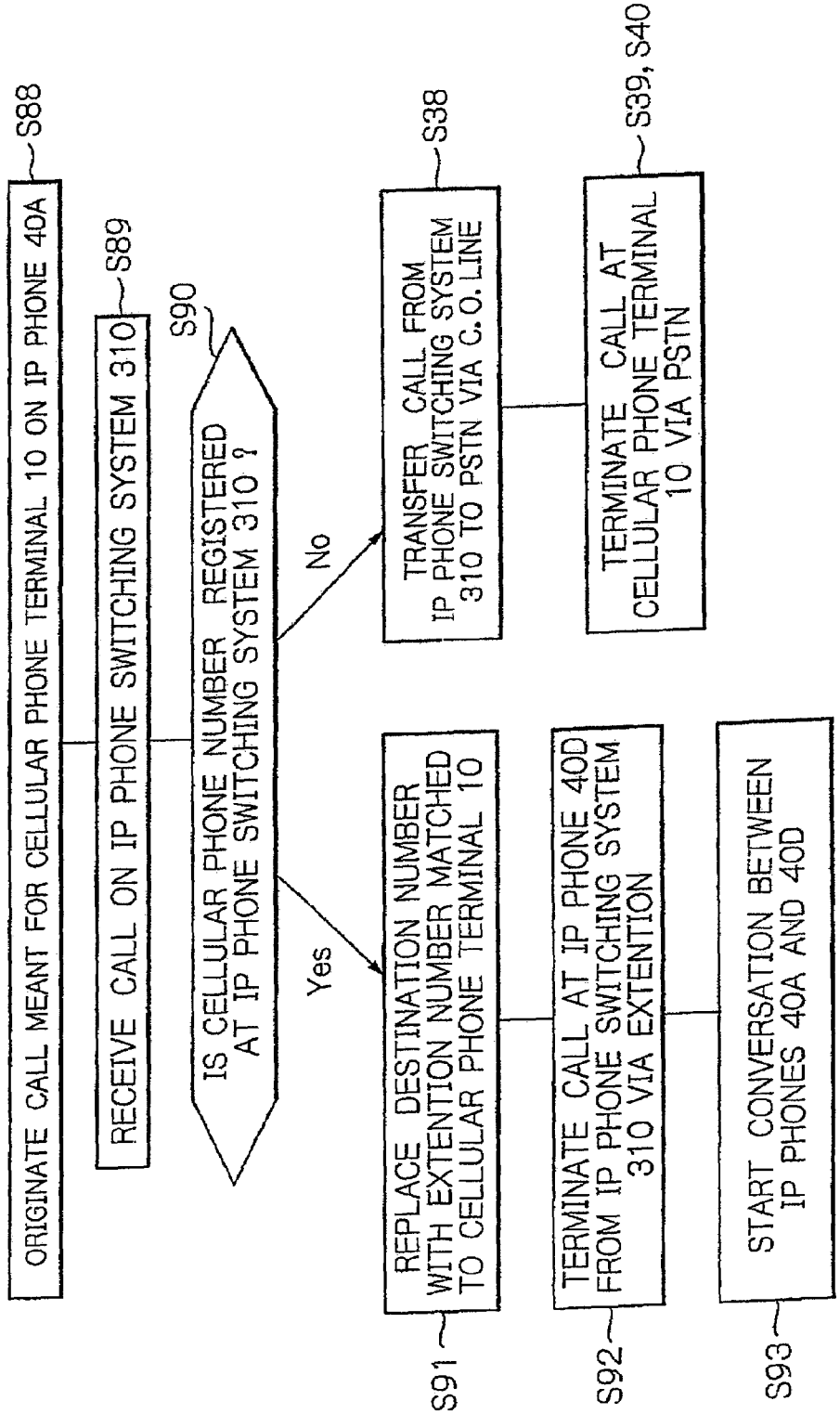
FIG. 21 is a flowchart useful for understanding a specific switching sequence available with the fifth embodiment.

FIG. 21 shows the control flow of the IP phone switching system 310 to occur when a call meant for the cellular phone terminal 10 is originated on the IP phone set 40A accommodated in the switching system 310. As shown, the origination of a call meant for the cellular phone terminal 10 on the IP phone set 40A (step S88) is sensed by the IP phone switching system 310 (step S89). In response, the call controller 34 of the IP phone switching system 310 searches the position management database 35 for the cellular phone number of the cellular phone terminal 10 on the basis of a destination number received from the IP phone set 40A (step S90).

As a result of step S90, if the destination number, i.e. the cellular phone number is not registered at the position management database 35 (No, step S90), the call controller 34 causes the call to be terminated at the cellular phone terminal 10 via the public switched network 50 as in the first embodiment (steps S38 through S40). By contrast, if the destination number is registered at the position management database 35 (Yes, step S90), the call controller 34 searches for the transfer destination information matched to the cellular phone number and then substitutes the transfer destination information for the destination number (step S91). On the basis of the destination number, then, the IP phone switching system 310 extends that call to the extension via the extension network 60, so that the call is terminated at the adapter 240 or the IP phone set 40D (step S92). This allows the call connection to be held between the IP phone switching system 310 and the IP phone set 40D (step S93).

It will thus be seen that, if the user of the cellular phone terminal 10 merely sets the phone terminal 10 on the adapter 240 and then pushes desired one of the buttons 244, 245 and 246, he or she can answer a call, which may be terminated at the phone terminal 10 later, not on the phone terminal 10 but the IP phone or transfer destination 40D designated by the depressed button.

As stated above, when an incoming call is terminated at the cellular phone terminal 10, the illustrative embodiment allows a call connection to be held on the IP phone set or transfer destination 40D accommodated in the switching system 5 as an extension call, i.e. without being routed through the public switched network 50. The user of the cellular phone terminal 10 can therefore automatically use a less expensive line without intentionally selecting it.

It is to be noted that the configurations of the cellular phones, adapters, IP phone switching systems and private network lines, or extension networks, included in the embodiments shown and described may be suitably combined with any other of them to construct any desired switching system.

In summary, it will be seen that the present invention provides an switching system in which a switching system registers the position information of a radio communication terminal connected to an adapter and derived from number conversion information output from the adapter. Therefore, a call addressed to the radio communication terminal can be transferred on the basis of the position information. Further, the system of the present invention makes it unnecessary for a calling person to select a number and can effect, when a call addressed to the radio communication terminal is originated, voice communication by effectively using a LAN line, i.e. without routing the call through a public switched network line.

The entire disclosure of Japanese patent application Nos. 2003-430527 and 2003-430586 both filed on Dec. 25, 2003, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A switching system having a LAN (Local Area Network) line connectable to a radio communication terminal, which effects radio communication to either one of a public switched network line and a leased network line, for executing call switching, comprising:

a telephone switching system accommodating the public switched network line and the LAN line for executing the call switching; and a terminal adapter for effecting communication to the LAN line when directly connecting the radio communication terminal, said terminal adapter delivering, while connecting said radio communication terminal, being supplied with electric power from said radio communication terminal and then detecting the connection of the radio communication terminal, number conversion information including terminal information stored in the radio communication terminal and an identification number assigned to said terminal adapter to said telephone switching system, and effecting communication on the LAN line between the radio communication terminal and said telephone switching system;

said terminal adapter comprising:

a voice controller for executing voice control on a basis of control information for a voice processing system, which is received from the radio communication terminal, to hold voice communication on the LAN line between the radio communication terminal and said telephone switching system;

said telephone switching system comprising:

a position information manager for registering, on receiving the number conversion information from said terminal adapter over the LAN line, the identification number of said terminal adapter and the terminal information of the radio communication terminal included in said number conversion information in one-to-one correspondence for thereby managing position information of the radio communication terminal connected to said terminal adapter; and a switching controller for searching, on receiving a call originated on either one of a telephone terminal accommodated in said switching system and an accommodated communication terminal having a voice communication function and interconnected to the LAN line, said position information manager for the terminal information in accordance with a destination number and substituting, if the terminal information matching with the destination number is present in said position information manager, the identification number of said terminal adapter matching with the terminal information for the destination number to thereby control call switching.

2. The system in accordance with claim 1, wherein said terminal adapter connects at least one of the telephone terminal and the accommodated communication terminal and provides said telephone switching system with the number conversion information, including an identification number of one of the telephone terminal and the accommodated communication terminal which is designated as a transfer destination, said switching controller substituting, on detecting a call addressed to the radio communication terminal, the identification number of the one terminal designated as the transfer destination for the destination number to thereby controlling the call switching.

3. The system in accordance with claim 1, wherein, on detecting disconnection of the radio communication terminal from said terminal adapter, said switching controller deletes or invalidates the number conversion information registered at said position information manager.

4. The system in accordance with claim 1, further comprising a position information requesting section connected to the LAN line for requesting said telephone switching system to send out the position information registered at said position information manager;

said telephone switching system further comprising a registered information provider for providing, in response to a request from said position information requesting section, said position information requesting section with at least part of the position information registered at said position information manager.

5. A terminal adapter, which effects communication to a LAN (Local Area Network) line, connectable directly to a radio communication terminal effecting radio communication to either one of a public switched network line and a leased network line, supplied with electric power from the terminal and then detecting the connection of the terminal while connecting said terminal, for allowing the radio communication terminal to be accommodated in a telephone switching system, comprising:

a connector connectable directly to at least one radio communication terminal;

a communication controller for controlling communication with the LAN (Local Area Network) line;

a number conversion information sending section for receiving terminal information from the radio communication terminal connected to said connector, and providing said telephone switching system with number conversion information, which includes at least the terminal information and identification information assigned to said terminal adapter, via the LAN line; and a voice controller for executing voice control on a basis of control information for a voice processing system, which is received from the radio communication terminal, to hold voice communication on the LAN line between the radio communication terminal and said telephone switching system.

6. The adapter in accordance with claim 5, wherein the LAN line comprises an analog line, said communication controller executing communication control adaptive to said analog line.

7. The adapter in accordance with claim 5, wherein said terminal adapter has a LAN line side connected to an accommodated communication terminal having a voice communication function, said communication controller providing the accommodated communication terminal with voice data obtained from the radio communication terminal and the terminal information of the radio communication terminal.

8. The adapter in accordance with claim 5, further comprising a transfer destination designator for obtaining, after the radio communication terminal has been connected to said terminal adapter, a designation of at least one of a telephone terminal and the accommodated communication terminal as a transfer destination;

said number conversion information sending section providing said telephone switching system with, as a part of the number conversion information, an identification number of the one terminal designated by said transfer destination designator.

9. A radio communication terminal, which effects radio communication to either one of a public switched network line and a leased network line, connectable directly to a terminal adapter capable of being accommodated by a telephone switching system via a LAN (Local Area Network) line, supplied with electric power from the terminal and then detecting the connection of the terminal while connecting said terminal, comprising:

a connector connectable directly to the terminal adapter;

a voice processor for executing voice processing; and a controller for detecting connection of said radio communication terminal to the terminal adapter, disabling a radio communication section connectable to either one of a public switched network line and a leased network line and making said voice processor and the terminal adapter connectable to each other.

10. A program for connecting a radio communication terminal, which effects radio communication to a public switched network line or a leased network line, to a terminal adapter, which effects communication to a LAN (Local Area Network) line, for the radio communication terminal to thereby cause the radio communication terminal to be accommodated in a telephone switching system via the terminal adapter and the LAN line, said program being runnable on a processor system included in either one of the radio communication terminal and the terminal adapter to implement:

a communication control function, when directly connecting the radio communication terminal and the terminal adapter to supply said terminal adapter with electric power from said radio communication terminal and then to detect the connection between the terminal adapter and said radio communication terminal, for allowing communication to be held on the LAN line between the radio communication terminal and the telephone switching system on a basis of control information of a voice processing system of the radio communication terminal; and a number conversion information sending function for providing the telephone switching system with number conversion information including at least terminal information particular to the radio communication terminal and an identification number assigned to the terminal adapter via the LAN line.

11. The program in accordance with claim 10, wherein said terminal adapter has a LAN (Local Area Network) line side connected to an accommodated communication terminal having a voice communication function, said communication control function providing the accommodated communication terminal with voice data and the terminal information from the radio communication terminal.

12. The program in accordance with claim 10, further comprising a transfer destination designating function for receiving, after connection of the radio communication terminal to the terminal adapter, a designation indicative of at least either one of a telephone terminal and an accommodated communication terminal connected to the terminal adapter, said number conversion sending function adding a LAN identification number assigned to the at least one terminal designated by said transfer destination designating function to the number conversion information, and sending out the number conversion information to the telephone switching system.

* * * * *